US011560229B2

(12) United States Patent
Luca

(10) Patent No.: US 11,560,229 B2
(45) Date of Patent: Jan. 24, 2023

(54) HIGH-EFFICIENCY METHOD USING UNMANNED AERIAL VEHICLES FOR FIREFIGHTING

(71) Applicant: Valentin Luca, Santa Barbara, CA (US)

(72) Inventor: Valentin Luca, Santa Barbara, CA (US)

( * ) Notice: Subject to any disclaimer, the term of this patent is extended or adjusted under 35 U.S.C. 154(b) by 520 days.

(21) Appl. No.: 16/662,744

(22) Filed: Oct. 24, 2019

(65) Prior Publication Data
US 2020/0130831 A1 Apr. 30, 2020

Related U.S. Application Data

(60) Provisional application No. 62/752,143, filed on Oct. 29, 2018.

(51) Int. Cl.
*B64D 1/16* (2006.01)
*B64C 39/02* (2006.01)
(Continued)

(52) U.S. Cl.
CPC .............. *B64D 1/16* (2013.01); *A62C 3/0228* (2013.01); *B64C 1/30* (2013.01); *B64C 3/56* (2013.01);
(Continued)

(58) Field of Classification Search
CPC ...... B64D 1/16; B64D 5/00; B64C 2201/082; B64C 2201/128; B64C 2201/146; A62C 3/0228
See application file for complete search history.

(56) References Cited

U.S. PATENT DOCUMENTS 3,520,502 A * 7/1970 Smethers, Jr. ........... B64D 5/00
    104/103
7,690,438 B2  4/2010 Álvarez
(Continued)

FOREIGN PATENT DOCUMENTS

DE     102017100942 A1 *  7/2018

OTHER PUBLICATIONS

PCT International Search Report and Written Opinion dated Jan. 10, 2020 for in PCT Application No. PCT/US2019/057883.

*Primary Examiner* — Nicholas McFall
*Assistant Examiner* — Terri L Filosi
(74) *Attorney, Agent, or Firm* — McCarter & English, LLP

(57) ABSTRACT

A method of fire-fighting is provided based on unmanned aerial vehicles "UAV(s)" launched from transporter aircrafts to deliver water or fire-retardants or any other fire-fighting materials to a location selected by the fire-fighting personnel. A capability of putting-off high intensity forest fires is provided that stems from the precision and the quantity of material that can be delivered per unit surface per unit time. After releasing the fire-fighting material(s), the UAV reaches a safe altitude from which it flies on autopilot to intercept and then proceed on a pre-programmed route to land per pre-programmed instructions on an airfield from which fire-fighting transporter(s) operate, allowing a high efficiency along the line, from loading the transporter airplanes to maximizing the quantity of material that reach the target, to minimizing the remote-pilot time and up to the recovery system that minimizes the recovery cost and it maximizes UAVs' utilization by a quick turnaround.

9 Claims, 16 Drawing Sheets

(51) Int. Cl.
*B64C 3/56* (2006.01)
*B64C 5/12* (2006.01)
*B64C 9/34* (2006.01)
*A62C 3/02* (2006.01)
*B64C 1/30* (2006.01)

(52) U.S. Cl.
CPC ............... *B64C 5/12* (2013.01); *B64C 9/34* (2013.01); *B64C 39/024* (2013.01); *B64C 2201/021* (2013.01); *B64C 2201/082* (2013.01); *B64C 2201/12* (2013.01); *B64C 2201/145* (2013.01); *B64C 2201/146* (2013.01)

(56) References Cited

U.S. PATENT DOCUMENTS

| | | | |
|---|---|---|---|
| 8,234,068 B1 * | 7/2012 | Young | G08G 5/0069 |
| | | | 701/410 |
| 9,305,280 B1 | 4/2016 | Berg et al. | |
| 10,647,402 B2 * | 5/2020 | High | G05D 1/0027 |
| 2005/0006525 A1 | 1/2005 | Byers et al. | |
| 2011/0084162 A1 | 4/2011 | Goossen et al. | |
| 2012/0280054 A1 * | 11/2012 | Gomez | A62C 3/0235 |
| | | | 220/734 |
| 2014/0117147 A1 * | 5/2014 | Hanna | B64C 39/024 |
| | | | 244/2 |
| 2017/0015405 A1 | 1/2017 | Chau et al. | |
| 2018/0267562 A1 | 9/2018 | MacCready et al. | |
| 2018/0356841 A1 * | 12/2018 | Zilberstein | B64D 11/0015 |
| 2019/0009879 A1 * | 1/2019 | Phan | B64D 17/386 |

* cited by examiner

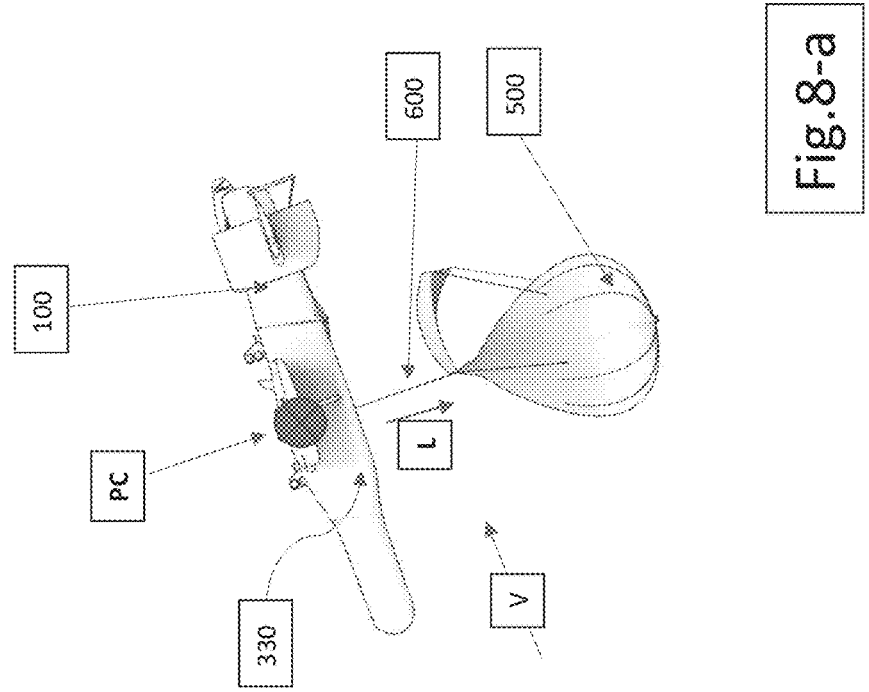
Fig.8-a
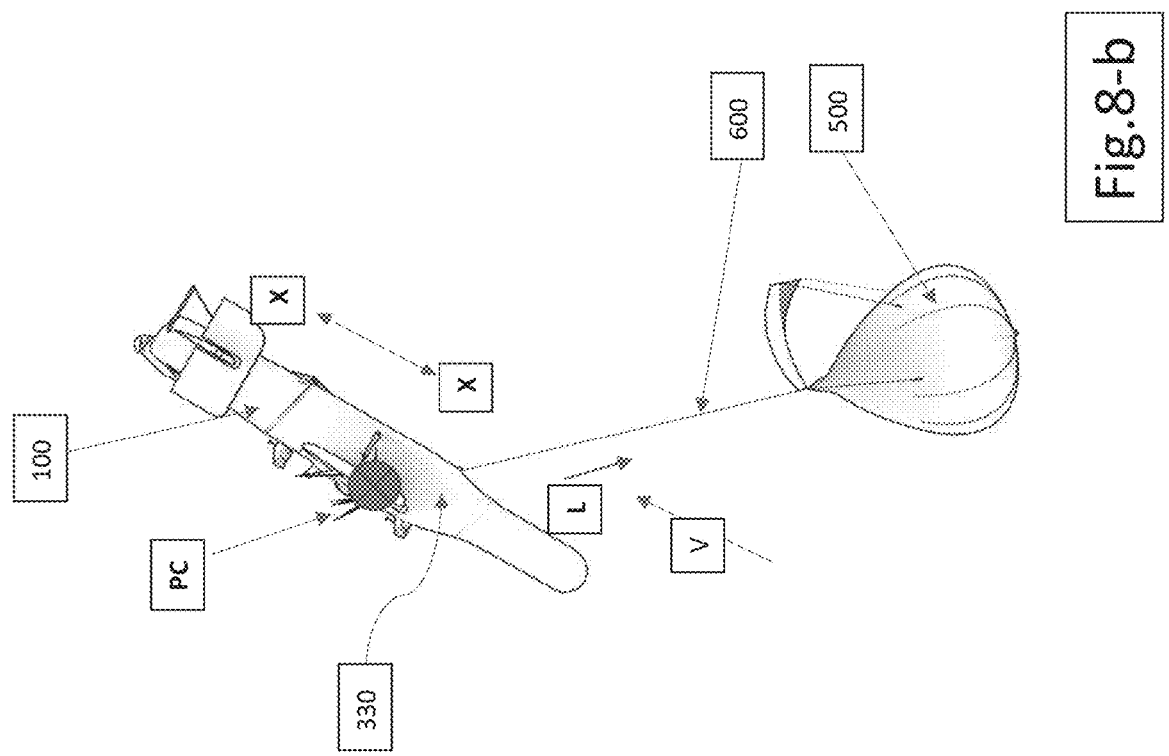
Fig.8-b

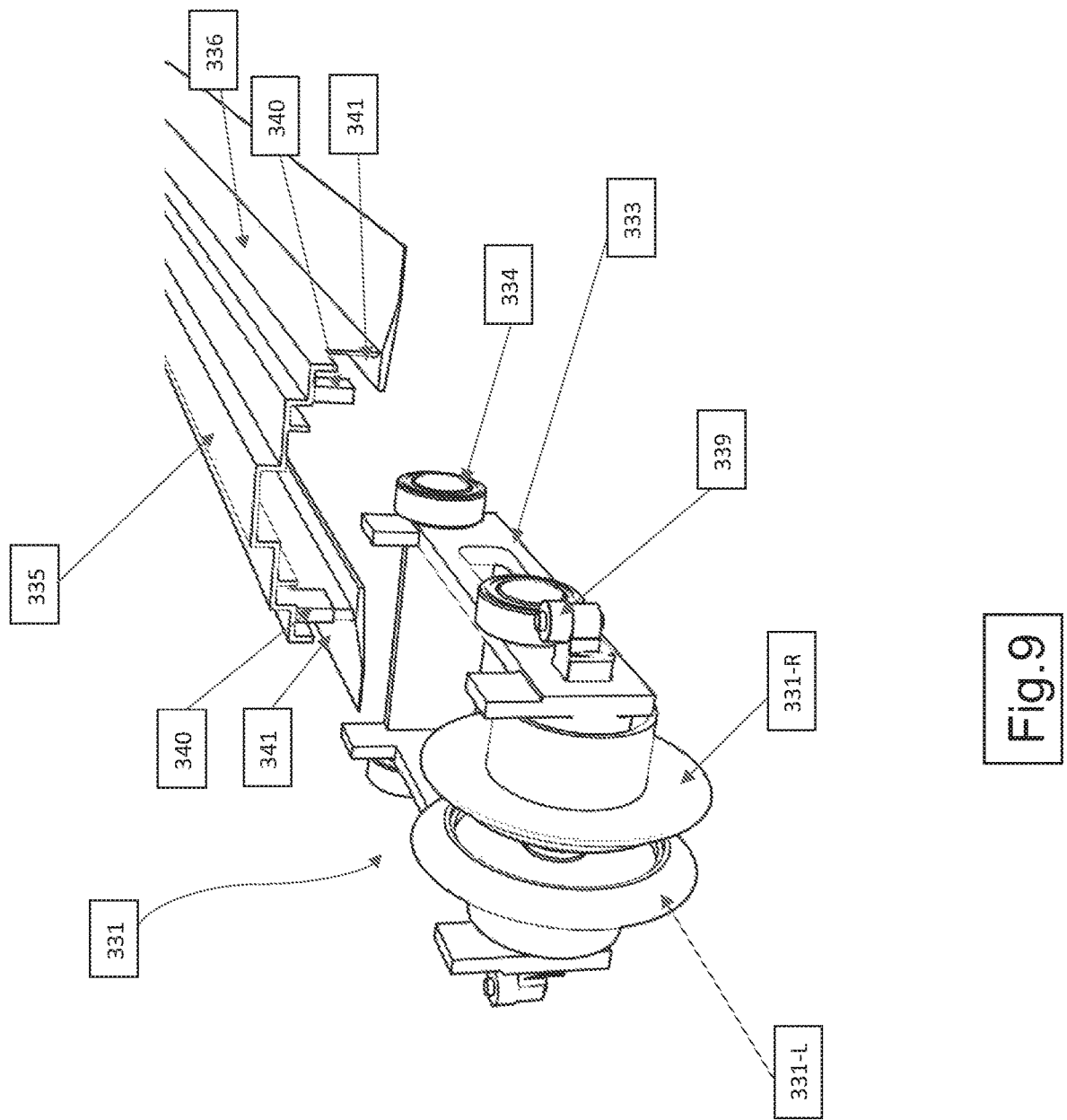

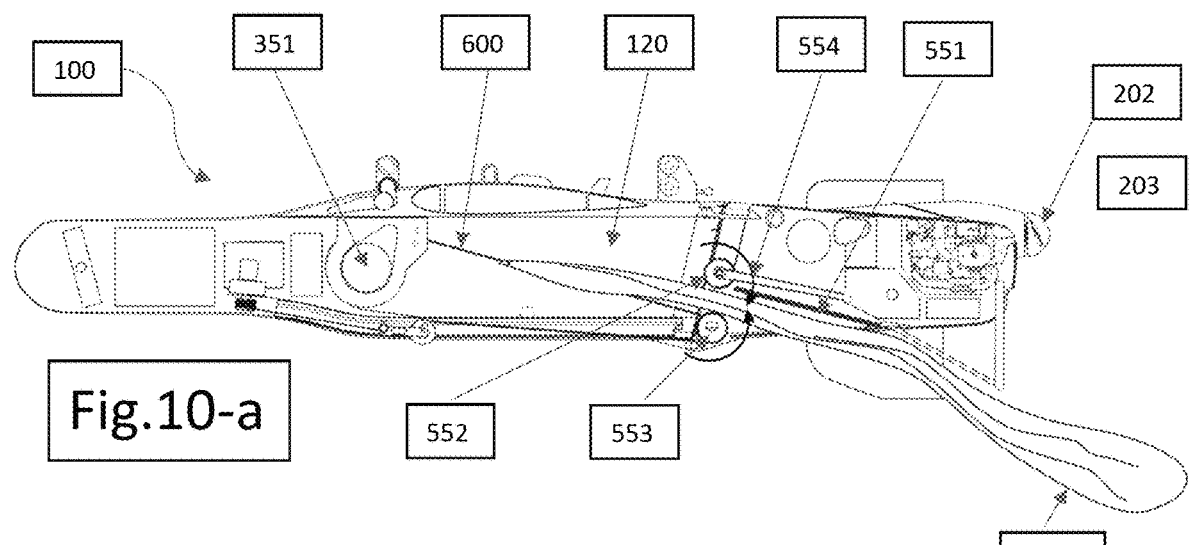
Fig.10-a
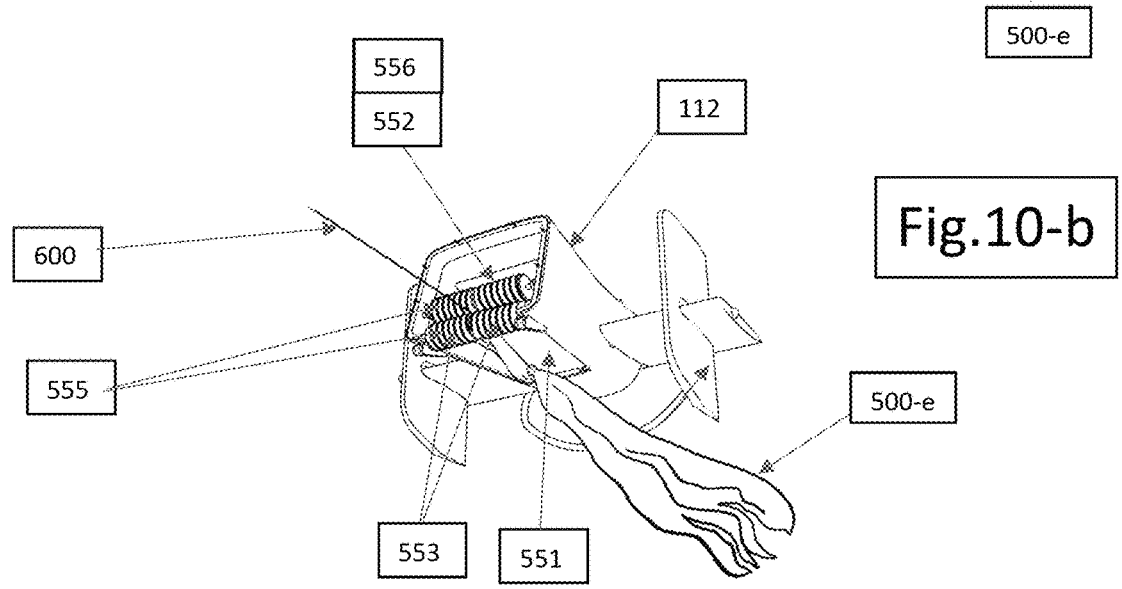
Fig.10-b
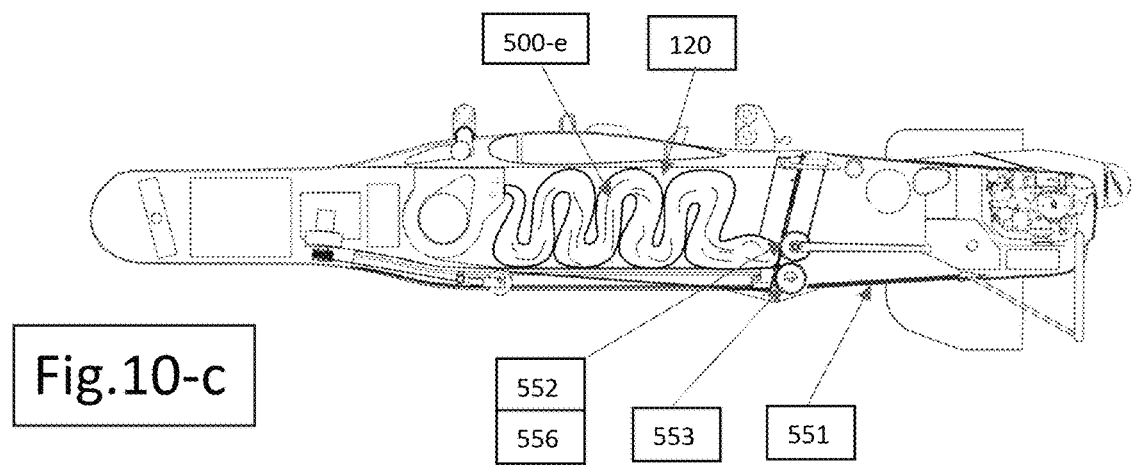
Fig.10-c

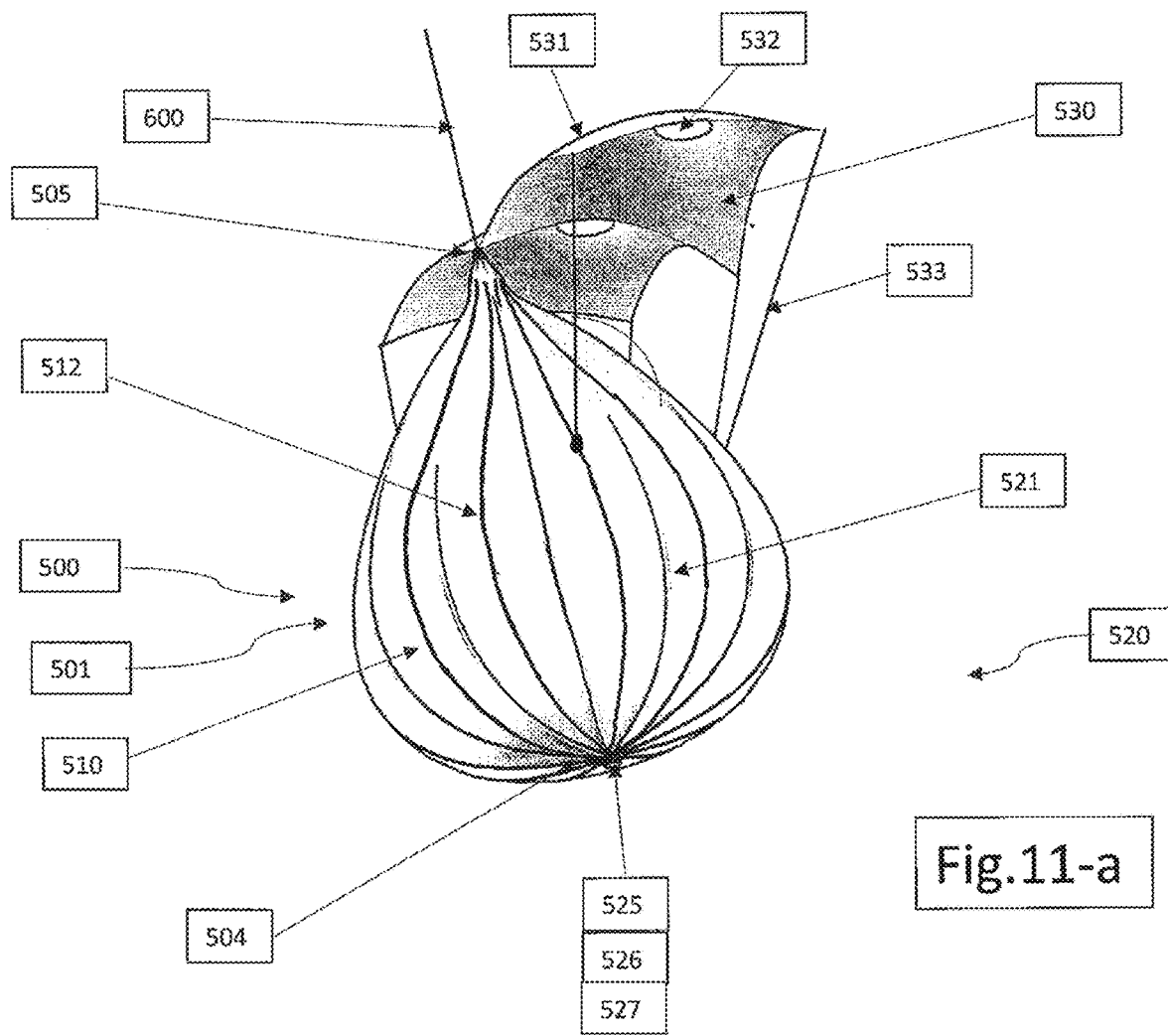
Fig.11-a
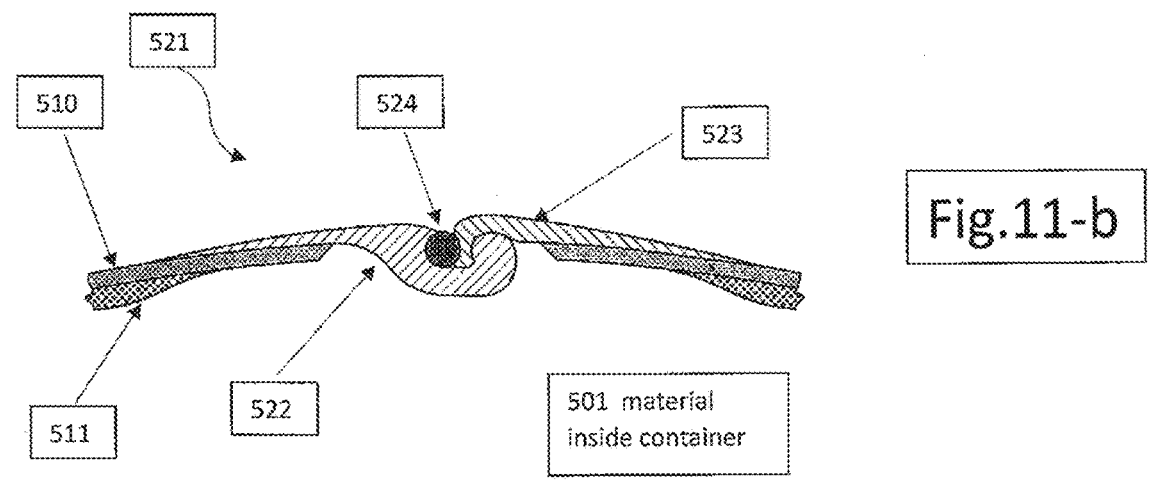
Fig.11-b

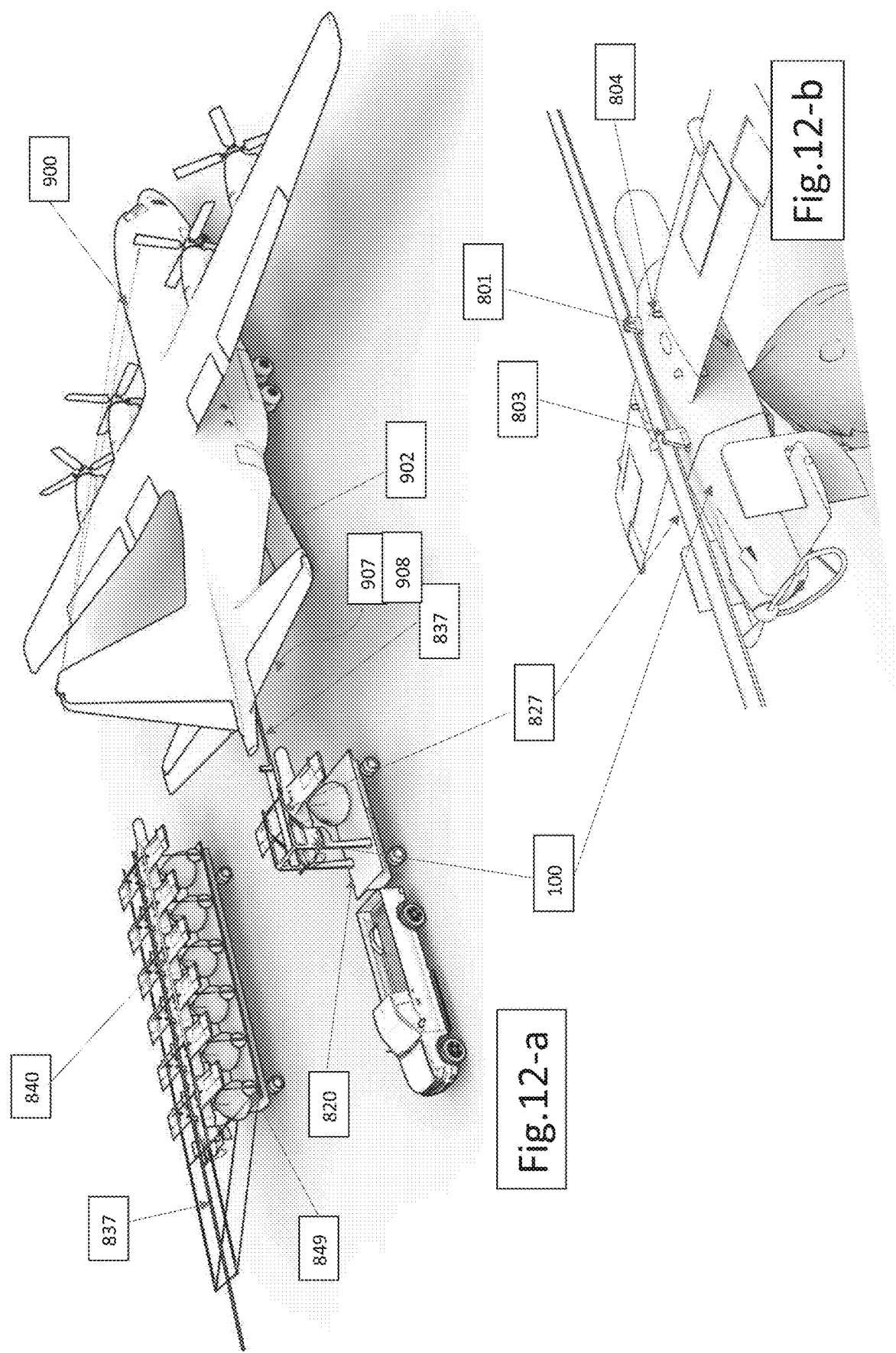

HIGH-EFFICIENCY METHOD USING UNMANNED AERIAL VEHICLES FOR FIREFIGHTING

CROSS-REFERENCE TO RELATED APPLICATION

The present application claims priority benefit to a provisional patent application entitled "High-Efficiency Method Using Unmanned Aerial Vehicles for Firefighting," which was filed on Oct. 29, 2018, and assigned Ser. No. 62/752,143. The entire content of the foregoing provisional application is incorporated herein by reference.

FIELD OF THE INVENTION

A primary intended application of the present invention is aerial wild fire-fighting. The set mission for the disclosed method and the related unmanned aerial vehicles (UAVs) described herein covers a large area of wild fire response, including putting out high-intensity forest fires occurring in hard to access areas to conventional water bombing of brush fires. While the current invention is described in connection with aerial firefighting, military applications of the disclosed method and the related UAVs are specifically contemplated.

BACKGROUND OF THE INVENTION

As global temperatures continue to rise, it is not only predicted, but already demonstrated, that wild fires will become more frequent due to extreme weather fluctuations in between severe droughts to high-energy thunderstorms. Wild fires are an accelerator of global warming; indeed, the amount of $CO_2$ released in the world represents a relevant percentage of the total $CO_2$ emission from using fossil fuels.

Wild fires are part of the nature cycle, but the current increase of global temperatures appears to be an alteration of the cycle and, irrespective of what is causing it, humans need to do whatever they can to delay a process that could lead to an Earth different from what we know today.

The current means of fighting wild fires are not up to the task as demonstrated by the results. Even in countries rated as the best prepared for wild fire fighting, there are repeated occurrences of fires that cannot be extinguished for weeks, months and even for more than one year.

Forest fires are among the most difficult to fight because of their high energy and because they generally occur in hard to access areas. Using aircraft for wild fire fighting comes as an obvious choice, not only because of the accessibility issue, but because a quick first response is needed as well.

A large variety of aircraft is used in wild fire firefighting for carrying/dropping water or retardant agents. Examples include:

Scooper planes specially designed for firefighting, e.g., CL215, CL415

Agricultural airplanes well adapted for firefighting, e.g., AT802

Transporter airplanes adapted to carry/drop water, or fire retardants, e.g., C130, C27, C17

Commercial jets adapted to carry and drop liquids, e.g., B747, DC10, BAE146, IL76

Helicopters of any type provided with buckets

Unmanned Helicopter, e.g., Kaman K-MAX

The large variety of aircraft used for firefighting is an indication that:
a) the number of aircraft allocated for the job is insufficient for the task and ad-hoc improvisations continuously add to the variety of types.
b) there is a lack of a clear convergence towards a limited number of efficient and sufficient firefighting methods & means.

As straightforward as it may look, the process of water bombing, especially in the case of forest fires, involves high risks and technical limitations, such that the current general opinion of firefighters is that aviation is a great help, but it cannot put out forest fires.

The technical limitations of using aircrafts to discharge water, retardant or any fire-fighting materials (collectively, "material(s)") stem from the required low flying speed at low altitude, in many cases encountering high turbulence, low visibility and need to fly over mountainous terrain. It is considered that being a forest firefighting pilot is riskier than being a fighter jet pilot and in fact, worldwide, there are only a few hundred pilots that are really up to the firefighting task.

Hence, the use of other means of delivering materials to inaccessible areas would be advantageous. Among potential alternatives are: artillery-fired containers filled with retardant, containers filled with fire-fighting agents dropped from aircraft flying at safer altitude, wherein the containers are adapted to release the agents at lower altitude so as to reduce the loss of agent due to pulverization at high altitudes, and containers provided with parachute, thereby providing reduced speed that minimizes the loss by pulverization, etc.

The use of unmanned aerial vehicles (UAV) as a solution for reducing the risks is still on the wish list since there are not yet UAV-based methods and means that could accomplish the task and be cost effective and practical from an operational point of view. The unmanned Kaman K-MAX helicopter is may be the single successful case, but this is bound to the helicopter-related limitations: e.g., capital cost and operating cost, payload, speed and range.

While, during the last two decades there was a tremendous development of winged UAVs, none of the existing UAVs is adaptable to the specific requirements for water bombing.

Using UAVs for wild fire-fighting, especially high-intensity forest fires, and integrating them into a coherent operating system is a complex problem due to the multitude of parameters and constraints. This explains why, despite an urgent need for a solution, there is not yet one; attempted solutions focused on some requirements at the expense of others and failed to realize a workable, practical, compromise.

The methods and apparatus address the shortcomings noted herein and provide advantageous UAV-based firefighting methods/apparatus that provide beneficial firefighting capabilities. Additional applications of the UAV-based methods/systems are also contemplated and available, as will be apparent to persons skilled in the art based on the description which follows.

SUMMARY OF THE INVENTION

The present invention provides a method and means to use UAVs in aerial firefighting. The disclosed method and means is advantageously adapted to deliver firefighting materials on target(s), even in the most challenging conditions, such as high-intensity forest fires occurring in mountainous terrain under low or no visibility.

The disclosed method and associated means allow putting-out high-intensity forest fires, not only delay of such forest fires.

The present invention also discloses features that allow UAVs to transport heavy loads of fire-fighting material, even heavier than UAV's cruise weight, while maintaining the needed maneuverability for guidance to the target and for high-G recovery.

The present invention also discloses features that allow the materials to be released at low height/elevation over the target and at angles that allow achieving a high delivery efficiency and reduction in dispersion losses.

The present invention also discloses method and means that allow minimizing the amount of time the UAVs are piloted by a remote pilot.

Still further, the present invention also discloses method and means to recover the UAVs for quick return to a continuous operation.

Additional features, functions and benefits of the disclosed UAV-based method and means will be apparent from the description which follows, particularly when read in conjunction with the appended figures.

BRIEF DESCRIPTION OF THE FIGURES

To assist those of skill in the art in making and using the disclosed method(s) and means, reference is made to the accompanying figures, wherein:

FIG. 6 is partial longitudinal cross section through a transporter airplane showing the UAVs loaded in.

FIG. 8-a and FIG. 8-b illustrate principles associated with the stability system disclosed by the present invention.

FIG. 9 is a 3D detail view of an exemplary stability pulley installation.

FIG. 10-a is a longitudinal (X-Z) cross sectional view of an exemplary UAV while the emptied container is shown being pulled in the cargo bay of the UAV.

FIG. 10-b is a 3D partial view showing an exemplary system of recovering the emptied container and loading it by way of a cargo bay loading system.

FIG. 10-c is a longitudinal (X-Z) cross sectional view of an exemplary UAV showing the emptied container positioned within the cargo bay of the UAV;

FIG. 11-a is a 3D view of an exemplary container.

FIG. 11-b is a schematic cross section through watertight zippers provided on an exemplary container.

FIG. 12a is a 3D view of exemplary methods of loading the UAVs into a transporter plane. The illustrated methods involve (i) one by one loading, and (ii) loading of the entire load of UAVs mounted on a rack.

FIG. 12-b is a 3D detail view showing an exemplary system of installing the UAV on a rail, wherein the system may be used for servicing and for installing and ejecting the UAVs from the transporter airplane.

FIG. 14-a: UAV was ejected and it climbs above transporter's wake pulled by the rope.

FIG. 14-b: the container drops and rope is let free to reduce shocks on the transporter.

FIG. 14-c: rope is spooled in by the winch inside the UAV, pulling the UAV down towards the container.

FIG. 14-d: the container and the UAV are at a prescribed distance and the UAV engages into a stable flight, deploying the brakes or starting the engine as needed.

DETAILED DESCRIPTION OF THE INVENTION

As noted above, the present invention provides a method and means to use UAVs in aerial firefighting. The disclosed method and means is advantageously adapted to deliver firefighting materials on target(s), even in the most challenging conditions, such as high-intensity forest fires occurring in mountainous terrain under low or no visibility.

Mission's main goals and constraints that lead to the disclosed method and the UAV-related features disclosed by the present invention include:

a) Provide an operational cost and investment-effective solution capable of covering a large variety of wild fire-fighting conditions, including putting out high-intensity forest fires.

b) Maximizing the transport efficiency, defined herein as the ratio of the total weight of material carried by all UAVs on board a transporter aircraft to the maximum payload of the transporter aircraft (hereinafter "transporter").

c) Maximizing the delivery efficiency, which is defined herein as the ratio of the quantity of material that reaches the target (hereinafter "useful material") to the total quantity of material released by the UAV.

The capability to deliver from low altitude above target and true dive-bombing capability are key objectives of the present invention.

The altitude and the air speed at which even a slow flying airplane releases the water and fire-retardants are still high to cause substantial losses of useful material due to pulverization and vaporization before reaching the ground/target. The effect is amplified by the updraft.

The relatively high minimum speed and relatively low maneuverability limiting the minimum above ground altitude of the converted passenger jets result in a low delivery efficiency despite the large quantity of material they carry. Converted DC10 or B747 spread the material over an area as large as a football field such that their typical delivery density cold be three times lower than of a CL-415 scooper plane. Delivering the material in a dive reduces the dispersion.

d) i) Capability of a high delivery density speed ("DDS"), defined herein as the quantity of useful material delivered per unit area, in a unit of time. DDS, as needed for a high intensity forest fires, is maximized by steep dive bombing and the material released from the lowest altitude.

Putting-out some high-intensity fires may require multiple loads of material to be dropped on the same location in rapid sequence.

The capability of multiplying the DDS by releasing at short interval multiple loads over the same target is intrinsic to the disclosed method and the associated UAVs.

Putting out even a new forest ignition (high intensity, small footprint) requires a DDS that could exceed 5-30 times the DDS achievable by current water bombing in a single pass. Multiple passes at short intervals are difficult to achieve with the current technology and with the available fleet and resupply/operation bases.

ii) Capability of low DDS as well: Brush, and grass fires require a lower DDS to be put-out and a higher dispersion is more economic in this case. The higher dispersion is achieved in horizontal flight and releasing from higher height over target.

e) Multiple targets capability: One of the most vicious characteristics of high-intensity forest fires are the secondary ignitions resulting from incandescent materials up-drafted and carried by the wind. These generate new fire fronts that expand very quickly. These could be far beyond the fire breaks and could trap and be fatal for crews on the ground.

Such secondary ignition points are difficult to fight with current water bombers because the bombers should actually fly over those secondary ignition points.

The capability of fighting several targets in rapid sequence is a benefit/advantage of the disclosed method and associated UAVs.

f) On target with assured recovery. Current water bombing cannot be performed indiscriminately on any target due to safety concerns and technical limitations. It is an objective of the present invention to assure the recovery of the UAVs' after reaching difficult targets like a high-intensity forest fire on a slope, under high-turbulence updraft and low, even zero visibility. Answering the requirements:

The UAV should be high-G maneuverable and sustain a high rate of climb after releasing the material.

The UAV should be equipped with the opto-electronics as needed to assure remote pilot's situational awareness and provide accurate data to UAV's navigation and autopilot.

g) The UAV should be capable of flying in high temperature, through fire flames, for 5-10 seconds.

h) Minimize the number of remote pilots. The UAVs should be equipped with a navigation system and autopilot capable to carry on at least the recovery and flying and landing on a predetermined airfield at a predetermined time.

i) Reduced risk of fire caused by an accidental crash of an UAV. UAVs' fuel tanks should be crash resistant. Upon detailed evaluation, other fire-prevention systems like automatic foam release, use nitrogen to fill the tank could be used.

j) Minimize pollution. The UAVs should be capable of carrying back the emptied containers to be reused.

k) Security of the air traffic is not a subject of the present inventions—this is to be worked out with the regulatory agencies. The method and means proposed by the current invention allow the integration in a system agreeable with the regulatory agencies.

The method and the related UAVs presented in this invention work even if launched from altitudes below 6,000 ft above ground level. However, it is assumed that the regional air traffic control centers will agree to close the operation theatre to all other traffic at least below a certain flight level.

UAVs' navigation equipment allows low altitude above ground return routes, not used by commercial aviation and selected such that they are not frequented by general aviation or private planes either. Said routes would minimize passing over populated areas, conditions normally agreeable to the air traffic control authorities.

The regional air traffic control centers in the fire-prone areas should have in place a procedure for an expedited analysis, correction and approval of the proposed UAVs' routes from the operation theatre to their designated airfields.

The UAVs related to the disclosed method have a performant navigation system as required by the mission and it offers the platform for any additional equipment, e.g. transponders as required by the regulatory agencies.

The route of the transporter aircrafts towards and from the operation theatre is subject to the normal air traffic regulations.

Propulsion System

FIG. 1 shows the general features of the preferred embodiment of the UAV 100 associated with method disclosed by the current invention.

The preferred embodiment is a motorized UAV. The preferred embodiment shown in FIG. 1 is a pusher propeller propulsion system 200, but any propulsion system that fits the requirements could be used at constructor's choice.

Propulsion is a key feature of the UAVs associated with the disclosed method; it allows the recovery of the UAVs even from remote and inaccessible operation theaters and have the returned UAVs quickly available for continuous operation.

A glider-type UAV relies on speed to reach a safe altitude to fly towards a location from where it could be recovered. However, its operation is conditioned by the existence of a landing field within reach from the operation theatre. A condition of efficiency is that the recovered UAVs cold be returned quickly back to service which implies that the landing field should serve as a base for the transporter aircrafts as well.

A propulsion system adds to UAV's cost, but it enables a quick turnaround that, in the end, results in a low operating cost. Investment is also reduced since, fewer motorized UAVs will be needed for the same job.

Referring to FIG. 1, engine 201 drives a propeller 202. A guard of the propeller 203 is provided on the lower side to protect propeller during landing and against entangling the cable or rope 600, just "rope" hereinafter, that attaches the firefighting materials container 500 to the load carrying structure of the UAV 100.

The other propulsion related systems are shown in FIG. 7 that is a longitudinal (X-Z) cross-section through the UAV showing the general compartmentation. The systems and their locations are for reference only, they are part of general knowledge of aeronautical engineering.

The compartment 204, beneath the engine, houses the engine oil tank and oil cooling system. 205 designates the buffer fuel tank and the area 206 in the wing box houses the main fuel tanks.

Figure 1:
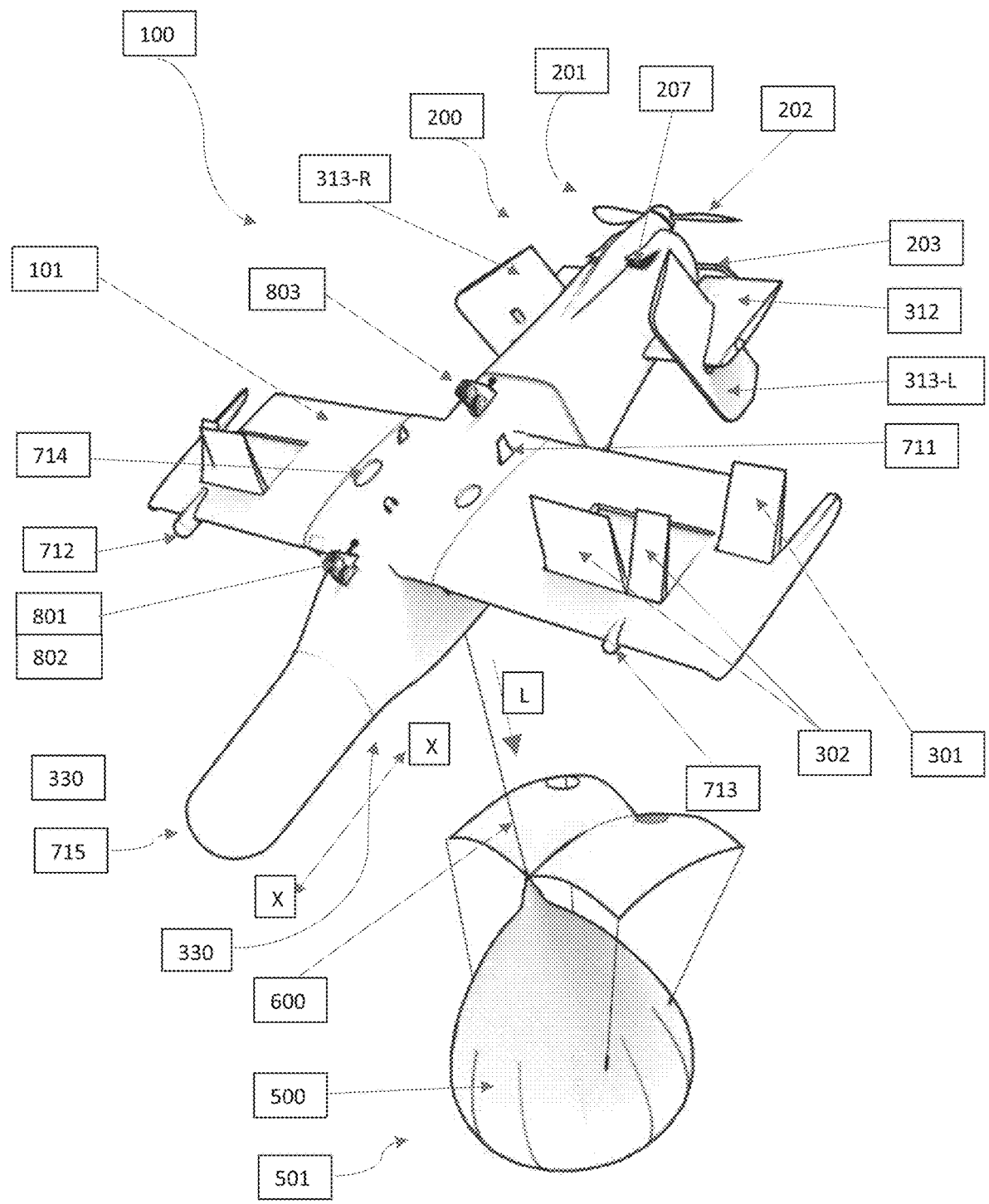
FIG. 1 is a 3D upper view of an exemplary UAV associated with the disclosed method. The firefighting materials are in an external flexible container attached to the UAV, e.g., by a rope or a cable. The UAV is shown in a dive towards a target and it has the aerodynamic brakes deployed.
Figure 2:
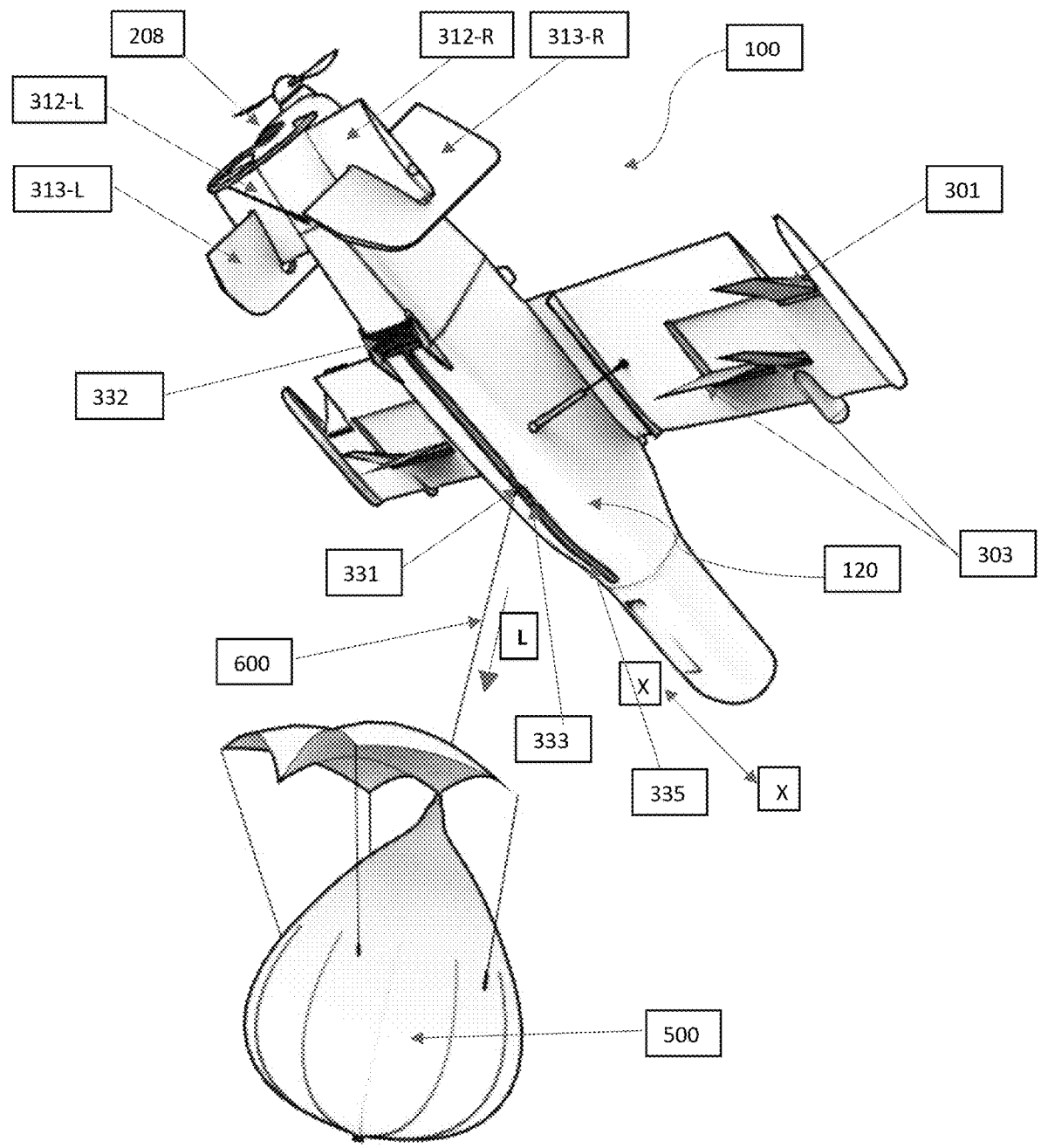
FIG. 2 is a 3D lower view of an exemplary UAV associated with the disclosed method. The firefighting materials are in an external flexible container attached to the UAV, e.g., by a rope or a cable. The UAV is shown in a dive towards a target and it has the aerodynamic brakes deployed.
Figure 7:
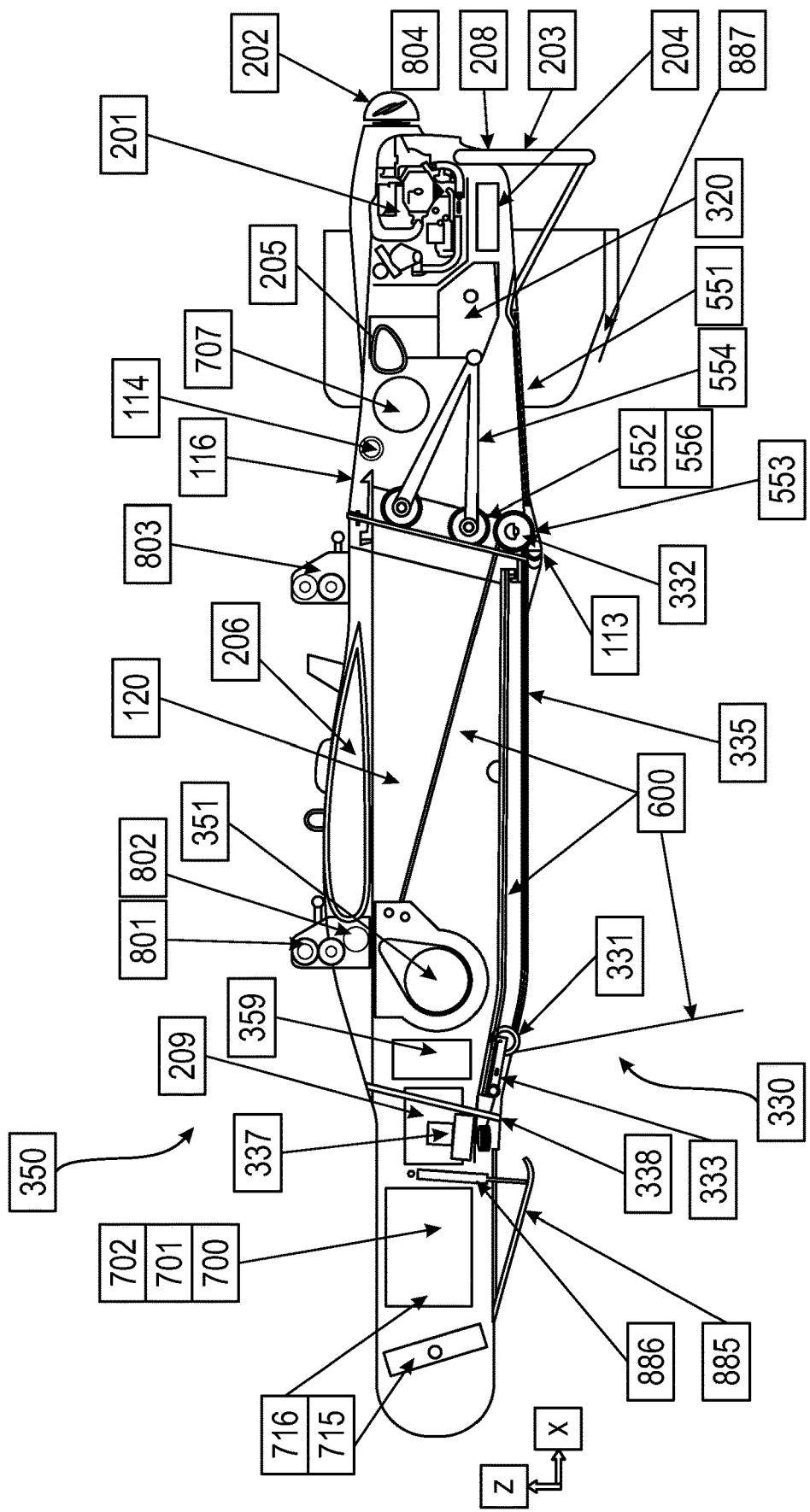
FIG. 7 is a longitudinal (X-Z) cross section through an exemplary UAV according to the present disclosure.

The air inlets are visible 207 in FIG. 1 and the outlet is visible 208 in FIGS. 2 and 7.

Reference 707 (FIG. 7) designates the compressed air bottle for supplying engine 201 with air while passing through very high temperatures areas.

The battery 209 is located close to the G winch 351, its frequency inverter 359 and the electronics compartment 700 (engine is started during a dive flight and hence it is helped by the air speed).

External Flexible Container Attached by a Rope to the UAV.

Referring to FIG. 1 the firefighting material is carried in the flexible container 500, referred as "container" hereinafter, attached by the rope 600 to the UAV's load carrying structure, just UAV 100 hereinafter.

Figure 3:
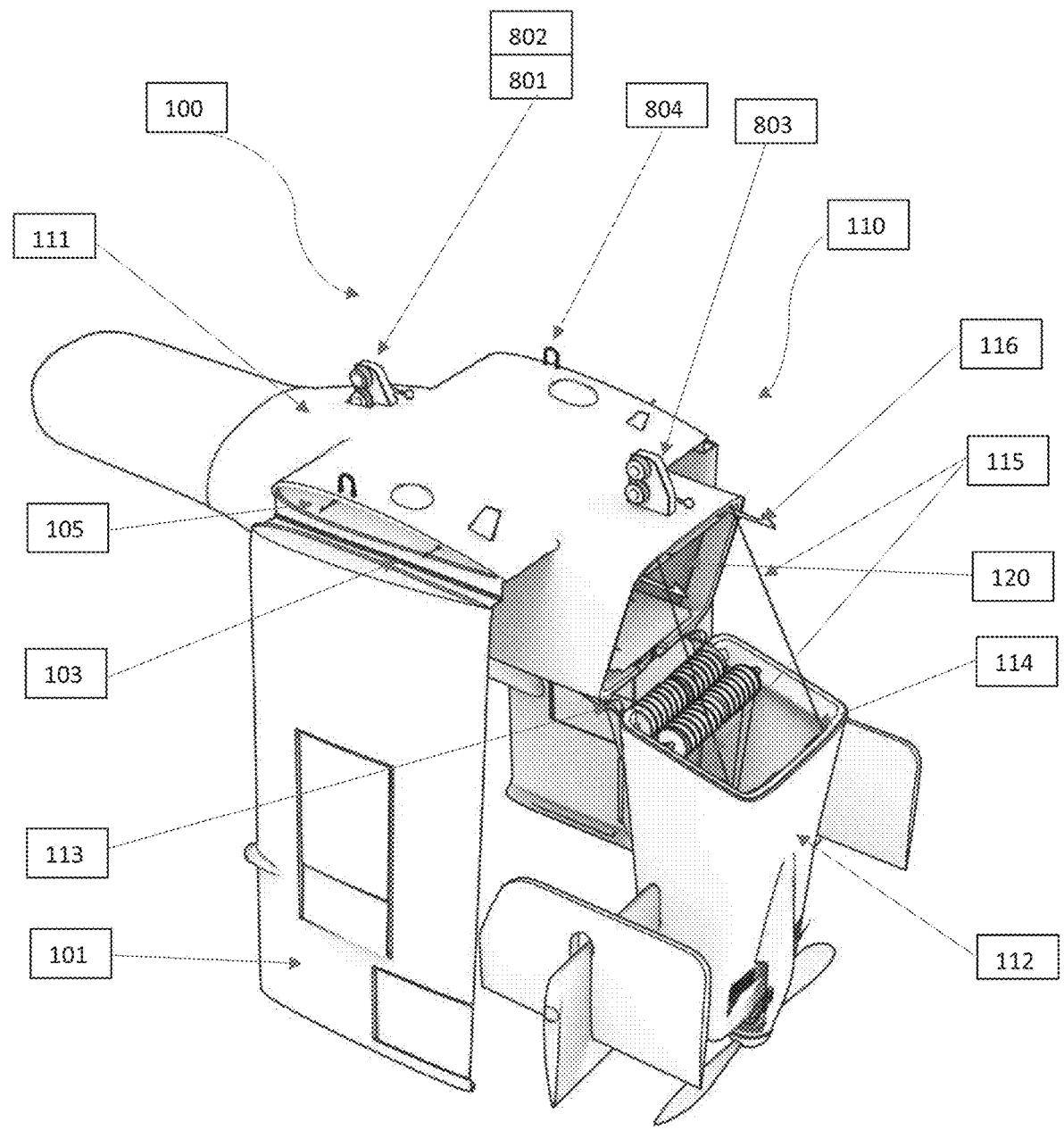
FIG. 3 is a 3D view of a preferred embodiment of the UAV associated with the disclosed method. Both the wings and the fuselage are shown in a folded position.
Figure 4:
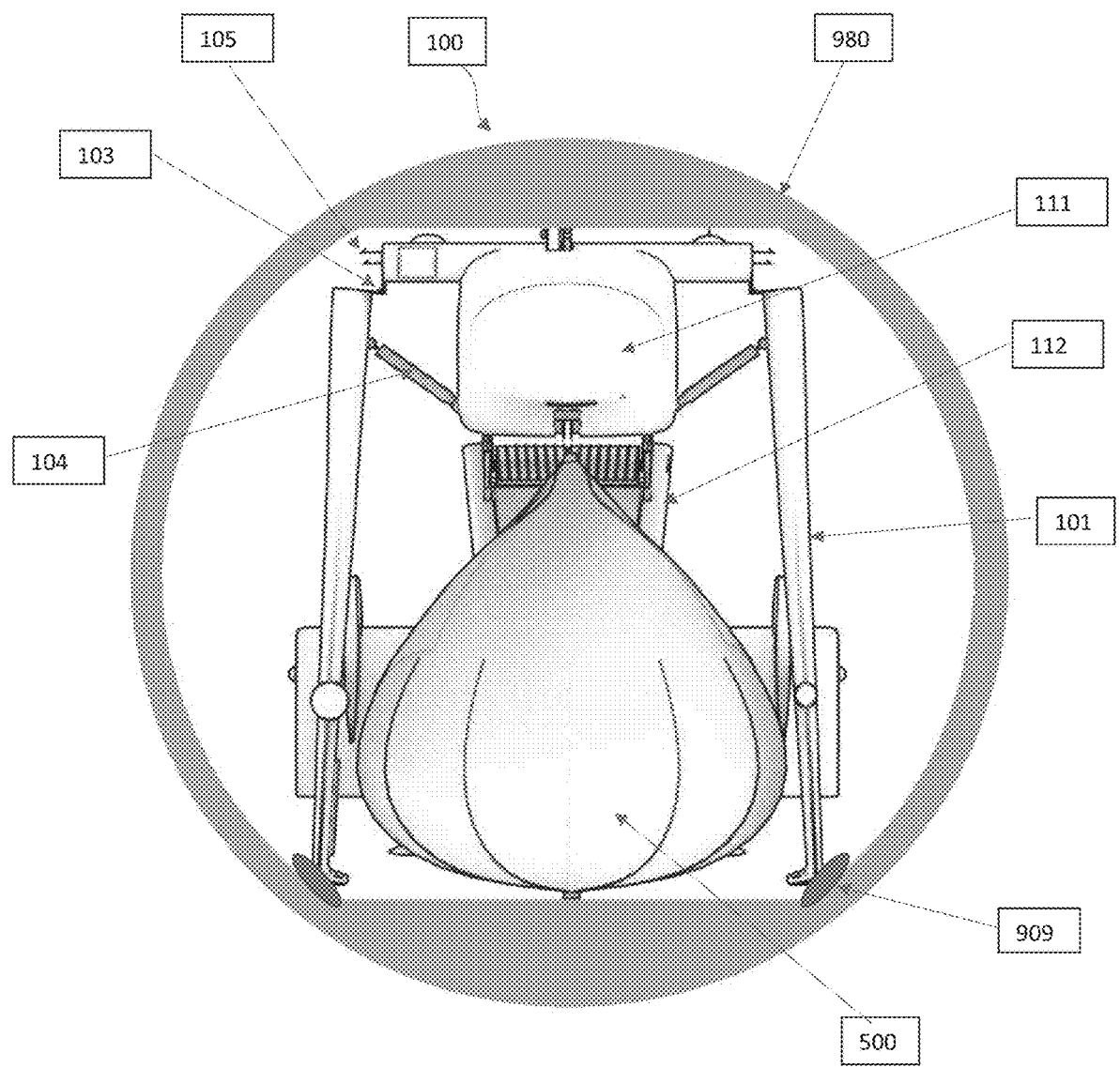
FIG. 4 is a sectional view through the cargo bay of a transporter aircraft. It shows how a folded UAV may fit in according to an exemplary embodiment.
Figure 5:
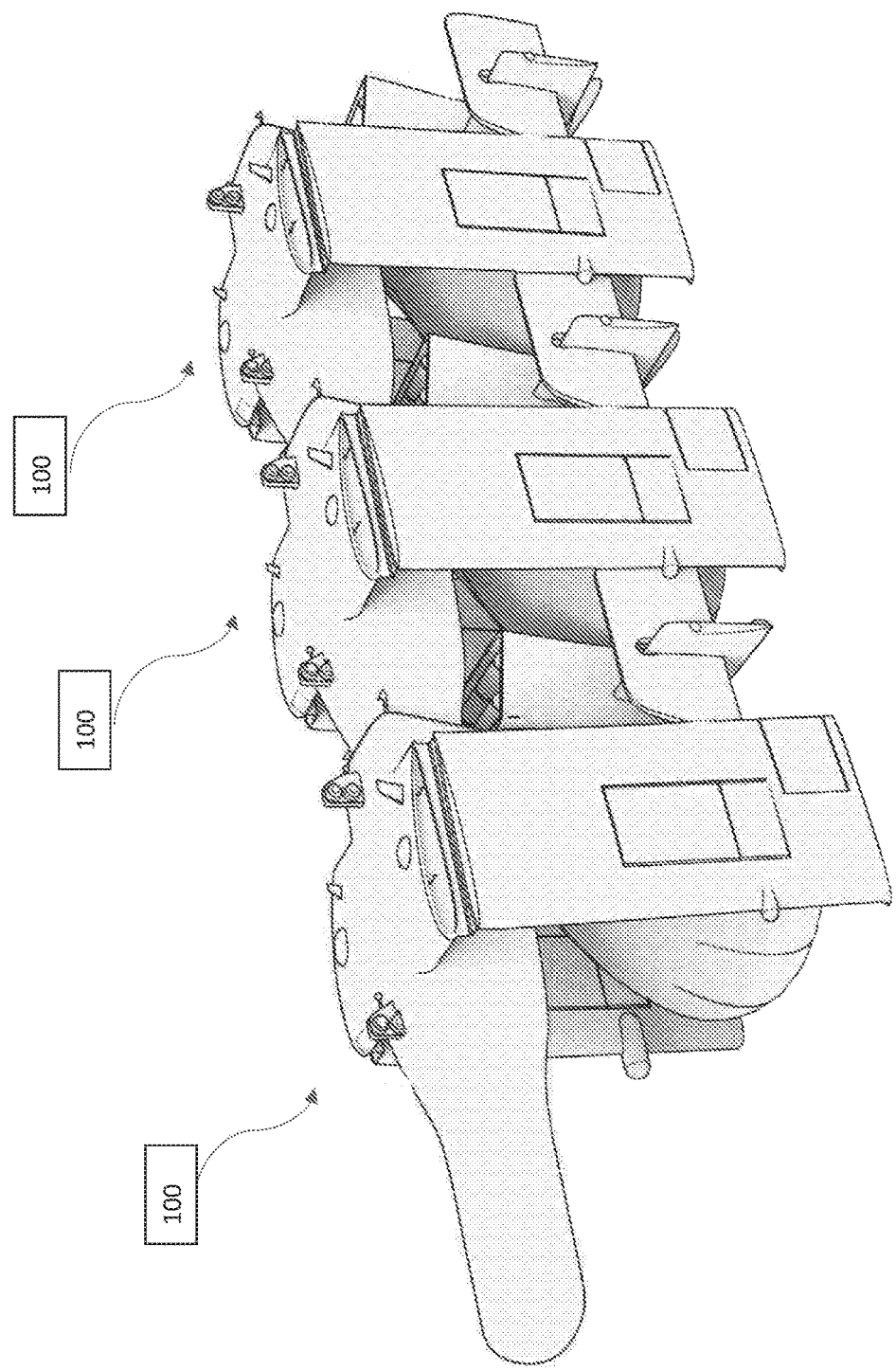
FIG. 5 is a 3D view of several (3) UAVs shown in folded position and arranged for maximum space utilization.
Figure 6:
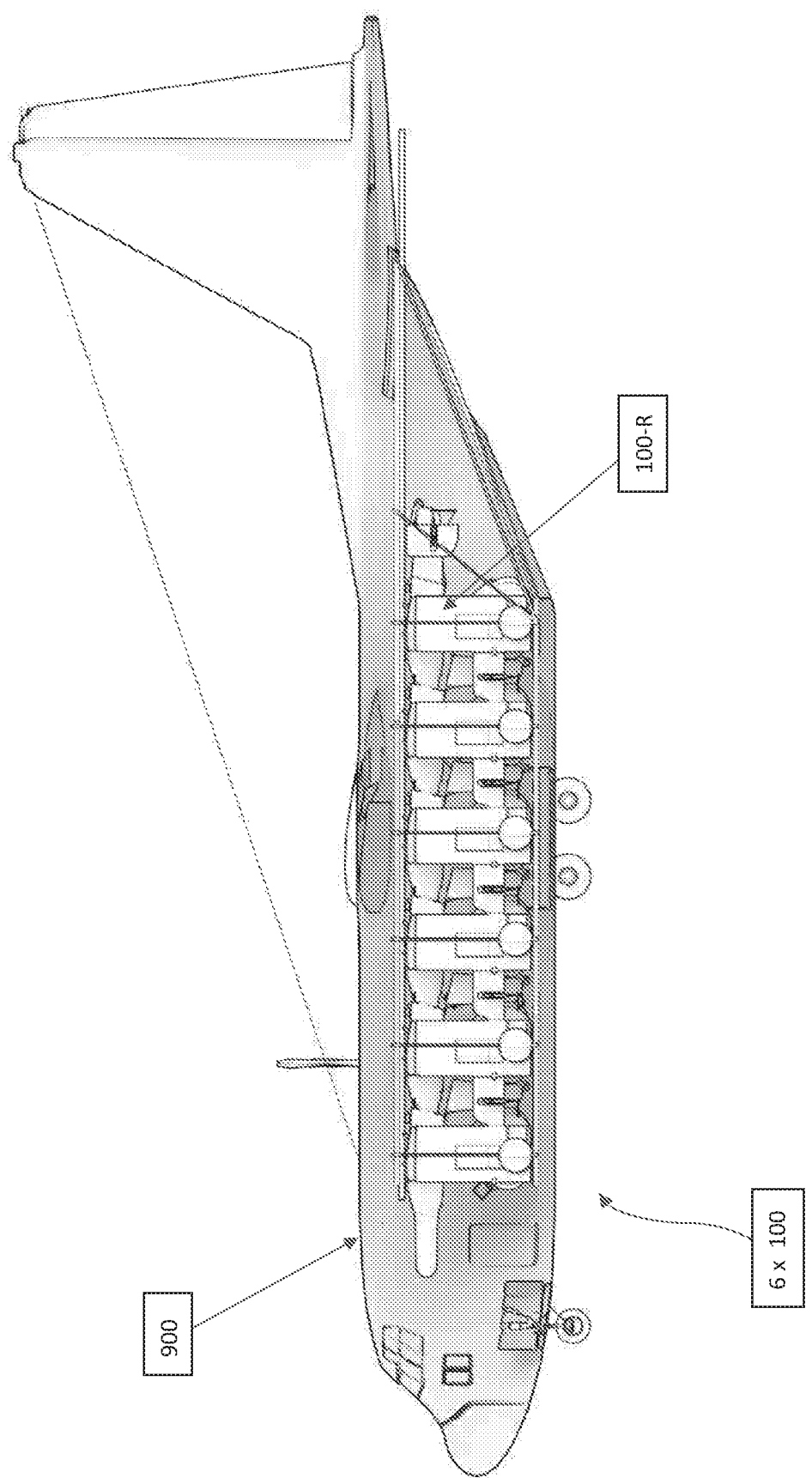

Using an external container facilitates a foldable construction of the UAV (see FIG. 3) that allows a compact arrangement in a transporter's cargo bay as it could be seen in FIGS. 4, 5, 6. This turns into high transport efficiency.

Note: While current technology of water bombing doesn't involve transporting UAVs, the transport efficiency is still limited. The water tanks and the rapid water release systems are relatively heavy. For instance, one water bombing system based on a very popular transport airplane that has a payload of 20 tons can carry only 12 tons of water because of the weight of the water tanks.

The external container attached by a rope, is also the basis for two systems disclosed by this invention, systems that are key to meeting mission's objectives efficiently and within set constraints.

One first system allows the UAV to carry heavy loads in flights ranging from horizontal to steep diving while the second system reduces the G-loads on the UAV. Reduced G-loads on the UAV translate into lower UAV weight and hence, higher transport efficiency and maneuverability.

An external container also allows a small cross section fuselage. Instead of having a bulky internal, leak-proof tank, the preferred embodiment UAV has a cargo bay 120 in FIGS. 3, 7, sized to store the emptied flexible container shown 500 (FIG. 1). This translates into sturdiness, low cost of structure and long range for the return flight.

Referring to FIG. 3, the fuselage 110 has two sections: rear fuselage 112 that is hinged 113 (FIGS. 3,7) to the front fuselage 111 and it is raised from the shown folded to deployed position by an electrical motor 114 (FIG. 7) installed on the rear fuselage 112 opposite to the hinges 113. The motor, 114 winds a pair of cables 115 (FIG. 3) attached to the front fuselage, rising the rear fuselage 112 until it is locked in by the schematically shown locks 116 (FIGS. 3,7) The fuselage unfolding is done before ejection from the transporter airplane.

FIG. 4 shows the preferred embodiment of the UAV 100 as it fits the cargo bay of a transporter airplane 980. The folded wings 101 are hinged 103 and are raised from the shown folded position to deployed position by the actuators 104 and hold in place by the schematically shown locks 105. To note the hinges 103, designed to sustain high G-forces. During transporter's flight to the operation theatre, the wings 101 are pushed by the actuators 104 against the cushions 909 to prevent damage.

The preferred embodiment for the UAV associated with the disclosed method, is a high wing design. As it is apparent from FIG. 4, the high wing allows higher wing span for the same folded overall dimensions.

Flight Controls

300 The flight controls of the preferred embodiment of the UAV are shown in FIG. 1, comprise:

On the wings 101, the ailerons 301 are independently actuated (wings 101 are foldable) and they could be used as flaps (flaperons) as well.

Two sets of brakes on the upper and on the lower side, respectively 302 (FIG. 1) and 303 (FIG. 2) are provided on the wings 101. Each brake has two, inboard and outboard segments (not numbered). Single or a plurality of segments could be also used depending on constructor's choice of the actuation system. FIG. 1 shows both inboard and outboard segments in deployed position.

Stabilator 312 (instead of a stabilizer+elevator) is provided on the preferred embodiment of the UAV 100 to meet the compact design combined with high maneuverability mission requirements. The 312-L and 312-R sides of the stabilator 312 are installed on the same shaft.

Dual rudders 313-L and 313-R are used on the preferred embodiment of the UAV due to compactness requirement. The preferred embodiment of the UAV 100 uses independent actuation for each rudder to use those as brakes as well; rudders 313-L and 313-R are shown in a convergent position in FIGS. 1,2.

The rudder actuators not shown are installed on the shaft (not shown) connecting the two sides of the stabilator 312. The stabilator and the rudder actuators are installed in the compartment 320, FIG. 7. The ailerons and brake actuators are located inside the wings 101 and not shown.

Two additional systems disclosed by the current invention are integrated into UAV's flight controls and are key to meeting the operational and the efficiency goals of the disclosed method. Both systems were made possible by attaching the container 500 to the UAV 100 the rope 600 (FIGS. 1,2).

One, first, additional flight control system, referred hereinafter as "the dive stability system" 330 (FIG. 7) that adjusts the direction of the force L (FIGS. 1, 2, 8-a, 8-b) exercised by the container 500 in respect to UAV's pressure center PC by adjusting the longitudinal (X-X) position of the rope 600 attachment to the UAV 100 (FIGS. 8-a, 8-b).

Note. In order to keep the UAV 100 out of the wake of the container 500, the length of the rope 600 is longer in the steep dive (FIG. 8-b) as compared to the glide (FIG. 8-a).

The dive stability system allows carrying a heavy container 500 in stabilized flight from horizontal to steep angles even for a high wing design with relatively small stabilizers or stabilators.

Operation from horizontal to high dive angle is a key requirement of the mission of the disclosed method. Besides the precision associated with the dive bombing, the high dive angles reduce the dispersion and, hence, it translates into a high delivery efficiency and delivery density.

Referring to FIGS. 2, 7, rope 600 turns around the stability pulley 331 forward-rearward slidable installed, on a guide 335 provided on the belly of the UAV 100 and then it turns over a fixed pulley 332 making almost 180° turn before being wound on a winch 351 (FIG. 7), referred as "the G-winch" hereinafter, located inside UAV's cargo bay 120.

Referring to the 3D looking forward, detail view, FIG. 9, the stability pulley 331 is installed on the pulley carrier 333 that moves on the four rollers 334 on the guide 335 that is integrated into UAV's load carrying structure. For clarity the carrier 333 is shown past its rearmost position, out of the guide 335.

The force on the stability pulley 331 is always rearwards and the position of the pulley carrier 333 is adjusted by the actuator 337 (FIG. 7) that pulls on the cable 338.

The stability pulley is formed by two left-right parts 331-L and 331-R installed on radial bearings (not shown) that allow axial movement. The two halves of the pulley 331 are kept pressed together by the rollers 339 confined by the side walls 336 of the guide 335. The rollers 339 are left-right slidable installed on anti-rotation guides (not shown) and they press on the pully through axial bearings (not shown). After the release of the material 501 from the container 500 (FIGS. 1, 2) the carrier 333 is let to roll to the rearmost position corresponding with UAV's recovery maneuver. When the carrier 333 reaches the rearmost position the rollers 339 are pushed by the cams 340 into the openings 341 provided on the side walls 336 of the guide 335. This causes the two pieces 331-L and 331-R of the stability pulley to suddenly open up and release the rope 600 that now goes to the winch passing only on the pully 332 (FIGS. 7, 10-*b*), configuration consistent with the recovery of the container 500.

The second, additional flight control system, referred hereinafter as "the Smooth G system" 350 (FIG. 7) has two functions integrated with UAV's flight controls:

One first function of the Smooth G system is to limit the G loads that would be normally transmitted by the container 500 to UAV 100 during high G loads maneuvers.

The G-winch 351 (FIG. 7) controls the force and accelerations during the winding and unwinding of the rope 600 protecting the UAV from high peak loads. Practically under a high-G maneuver, the G-winch 351 unwinds the rope 600 with a controlled acceleration and counting the remaining length of the wound rope. Subsequently the G-winch 351 starts winding up the rope 600 at a controlled acceleration resulting in a controlled overload on the UAV. Briefly, a low duration high load is distributed (smoothed) as a lower load over a longer period.

Figure 13:
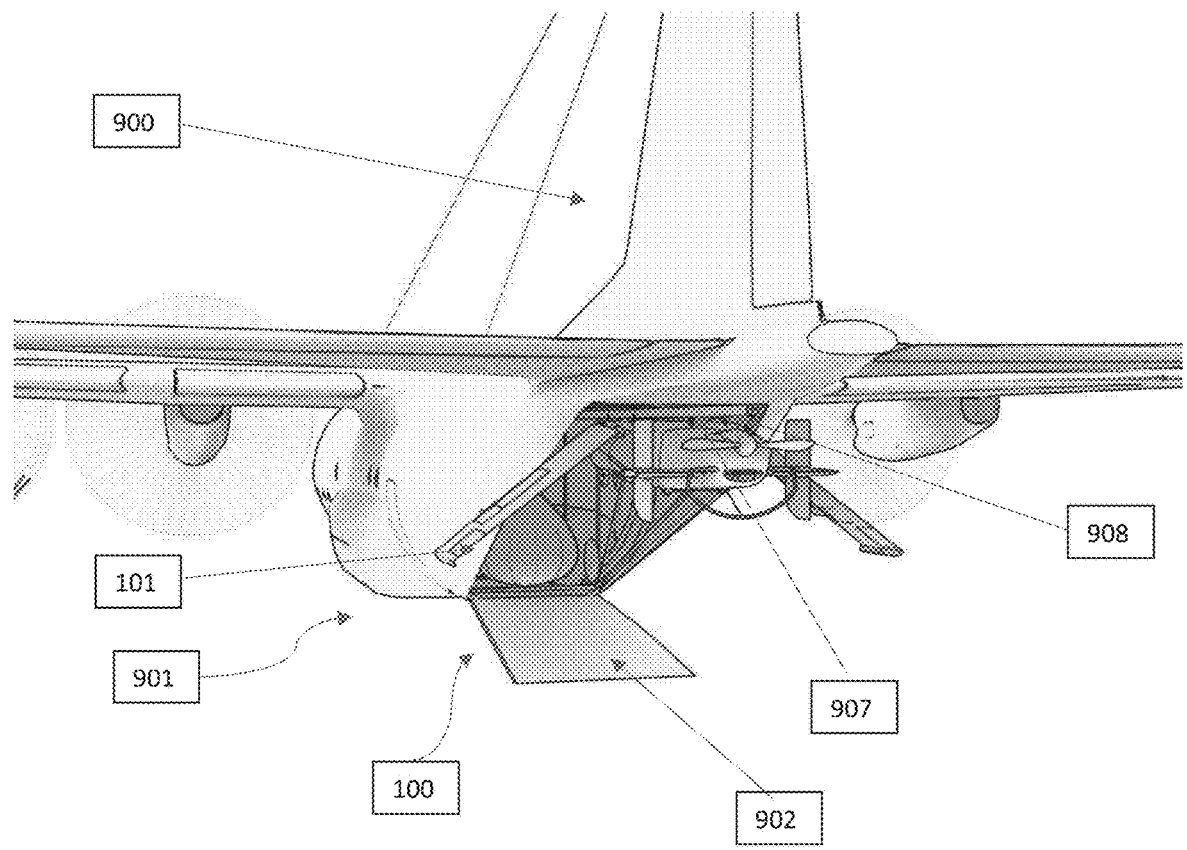
FIG. 13 shows an exemplary UAV ready to be ejected from a transporter aircraft. UAV's wings are only partially deployed because of transporter door geometry limitations.
Figure 14:
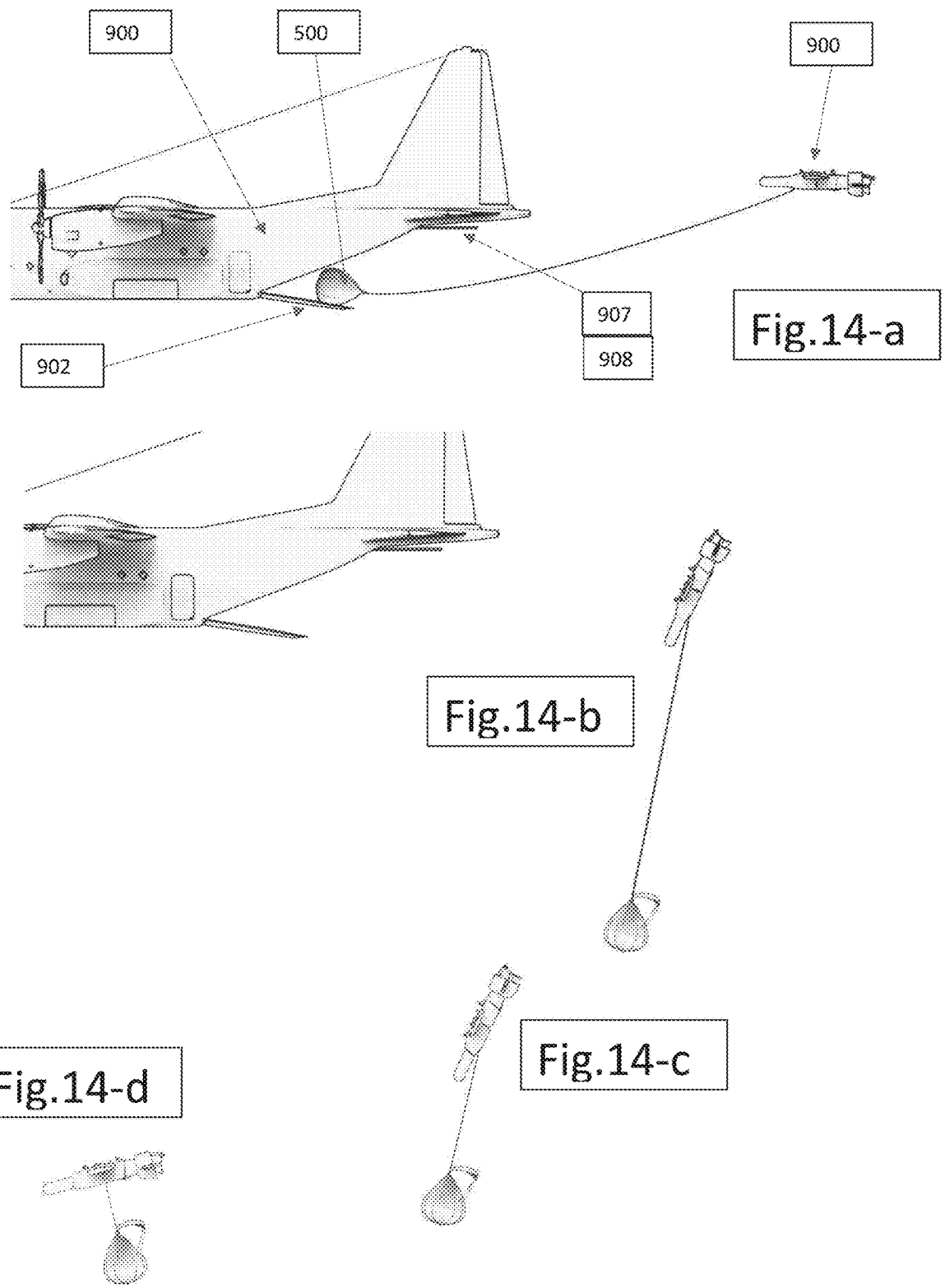
FIGS. 14-a, 14-b, 14-c and 14-d show exemplary flight phases between ejection and stabilized flight.

One example of a high G maneuver is UAV's ejection from the transporter 800 (FIGS. 13,14-*a*,14-*b*, 14-*c*, 14-*d*). During the critical phase of the ejection the G-winch 351 lets the rope 600 practically free such that the loads on the UAV are practically only the ones associated with its own weight.

The Smooth G system 350 is key for other maneuvers as well as explained in the following.

A second function of the Smooth G system 350 gives the UAVs associated with the disclosed method the flexibility needed to control the Delivery Density—see the c) and d-i) and d-ii) requirements.

Low DD entails a higher dispersion, and hence a lower delivery efficiency, but it is still the best method to put off the low energy grass fires. The low DD is achieved by releasing the material flying horizontally or at moderate angles and from a relatively higher altitude.

A medium DD is obtainable by extending the rope 600 such that the UAV 100 could fly safer, higher above target, while the material 501 (FIGS. 1, 2) is released from lower height above the target.

Figure 15:
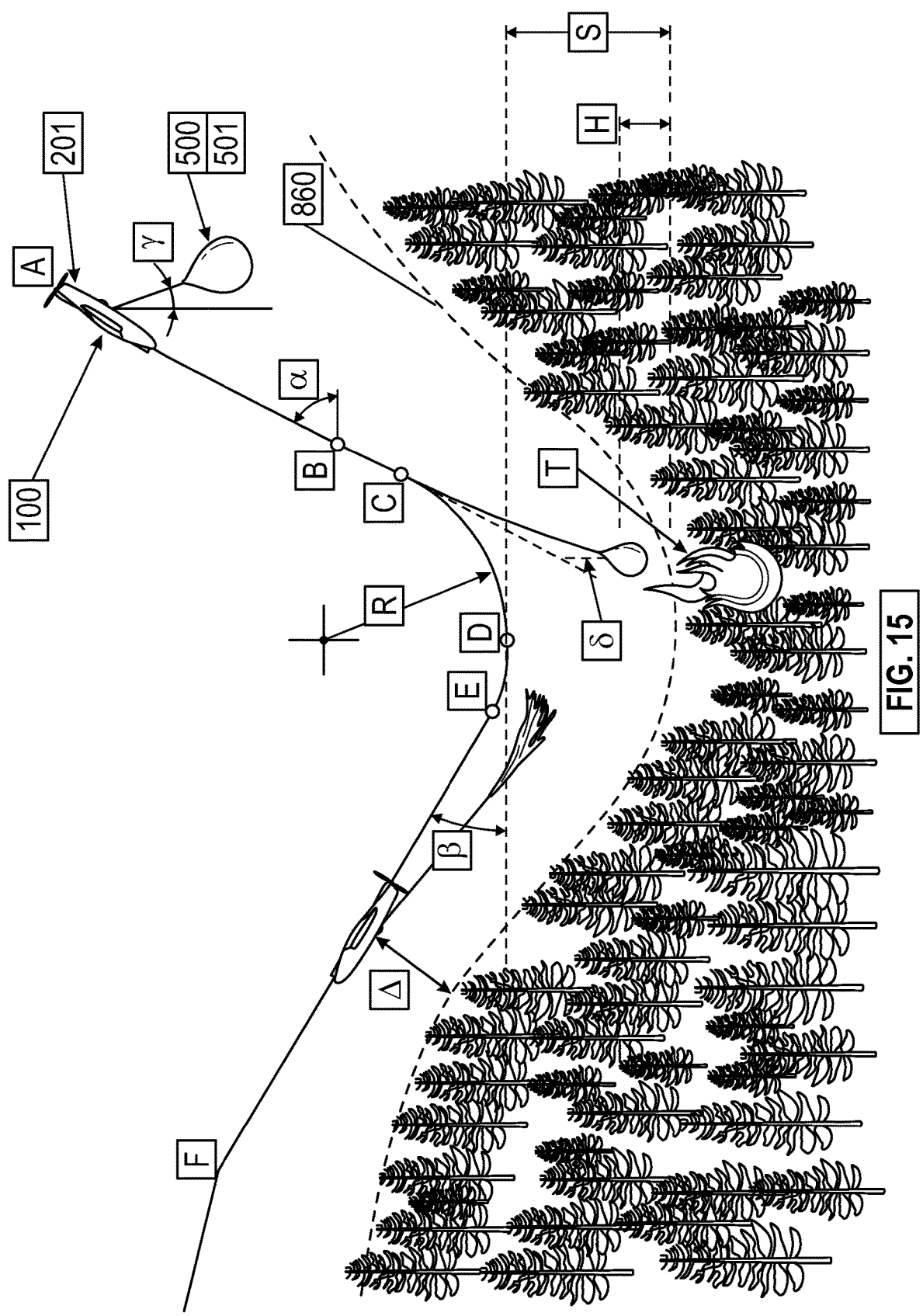
FIG. 15 shows an exemplary UAV engaging in its dive trajectory towards the target situated in a challenging position in a mountainous terrain.

The maximum DD is obtainable in a dive and, in this case, extending the rope 600, not only releases the load 501 at lower height over target, but it also reduces the G-loads on the UAV. The UAV is already in recovery mode when the material is being released as shown in FIG. 15.

A third function of the Smooth-G/Container recovery The G-winch 351 (FIG. 7 and FIG. 10-*a*) is also part of the container recovery system that pulls the emptied container 500-*e* and stuff it inside the cargo bay 120 of the UAV. The container 500 could be also abandoned or carried unstored, but this would conflict with the requirement j), or with an aerodynamically clean UAV for a longer flight range.

To note that some currently used water bombing systems, in order to increase the delivery efficiency, use disposable containers, some being equipped with parachutes. Some other systems use projectiles loaded with fire-retardant.

The container recovery function is not integrated into the flight controls—it is just triggered by the release of the material 501 from the container 500. This starts winding of the rope 600 and pulls the emptied container 500-*e* (FIG. 10-*a*) that eventually pushes open the spring-loaded flap door 551 (FIGS. 10-*a*, 10-*b*, FIG. 7) and subsequently it is engaged in between the loading spiral-spools 552 and 553 as shown in FIGS. 10-*a*, 10-*b*).

When the container hanger 505 (FIGS. 11-*a*) reaches the winch 351, the winch stops winding the rope 600.

The lower spool 553 is formed of two sections, left and right of the fixed spool (FIG. 10-*b*).

The upper spool 552 is installed in between left and right arms 554 (FIG. 10-*a*, FIG. 7) that are spring loaded such that the upper spool 552 is pressed against the lower spool 553. The upper spool is provided with a motor 556, not shown, (located inside the spool), and it starts to rotate when the flap door 551 is opened by the incoming container 500-*e*. Both spools 552 and 553 are provided with spiral protuberances 555 (FIG. 10-*b*) that combined with the direction of rotation of the upper, motorized spool 552 pushes the material of the container 500-*e* to the sides, flattening it while pushing it into the cargo bay 120 (FIGS. 10*a*, 10-*b*). The emptied container is pushed into the cargo bay 120 (FIG. 10-*c*) until eventually the flap door 551 is allowed to close. Flap door 551 closure causes the motor 556 to stop.

Referring to FIG. 10-*a*, after the material 501 is released, the emptied container 500-*e* trails the UAV 100 and the propeller protection 203 prevents any accidental entangling with the propeller 202.

The Container 500

The container 500 for carrying the material 501 is shown in FIG. 11-*a*. Container has a basically spherical shape that, under the weight of the carried material 501, tends to deform to a pear shape when suspended by the rope 600. Its skin 510 is made of impervious foldable high-strength material. The skin 510 is also strengthen by bonded reinforcements 511 (FIG. 11-*b*) and ropes 512 (FIG. 11-*a*) disposed to direct the loads to container's hanger 505 that is attached to the rope 600.

Referring to FIG. 11-*a*, the container 500 is provided with means 520 to largely open for quick release of the material 501. These consist of a plurality of watertight zipper-type seams 521 arranged along the meridians of the container, start at approximately at the equator and meet at the lower end 504 of the container.

Referring to FIG. 11-*b*, the seams are formed by two parts, an essentially rigid hook holder 522 and a flexible hook 523 that, when engaged form a water tight connection secured in place by the flexible thread 524 that is squeezed in between the hook holder and the hook.

The design of the zipper seam 521 is such that if one end of the thread 524 is pulled out of the seam, the flexible hook 523, under the pressure of the material 501 bents and opens the seam, opening that subsequently propagates along the entire seam 521.

The seams 521 meet at the lower end of the container and they are sealed and squeezed in between two plates of the mechanism 525, one plate inside the container 526 and the other plate 527 outside the container. The mechanism 525, is battery operated and wireless triggered to release the squeezing force in between the plates 526 and 527 causing the seams 521 to open. Once opened at the lower end, the opening propagates all along the seam to the equatorial area of the container, causing a sudden release of the material 501.

Parachute

The preferred embodiment of the container 500 is provided with a parachute 530 system mainly to act as a brake during steep dives, but it is designed such that at shallow angles it contributes with some lift too as it could be seen from the intuitive views in FIGS. 8-*a*, 8-*b*. Parachute is provided only on one side of the container for stability reasons. Also, for stability reasons the holes 532 are provided in the canopy 531 of the parachute. The canopy length is limited to less that the length of the emptied container to prevent entangling the propeller 202 (see FIGS. 10-*a*, 10-*b*) during the recovery of the container. Five of the cords of the parachute 533 are attached to the corresponding reinforcement ropes 512 and one is shortly attached to the hanger 505.

Piloting and Navigation Equipment 700

It is understood that the UAV related to the method disclosed herein, could be built using different types of equipment to meet same mission's requirements depending on technology's advances and on constructor's capabilities and preference.

Related to equipment, the main objective for preferred embodiment of the UAV 100 is to offer the right platform for different alternatives of equipment, meaning:

The UAV is provided with complete set of aerodynamic flight controls and additional systems as required for UAV's specific mission; the dive stability 330 and the Smooth G 350 systems disclosed by the present invention.

The UAV has the capability to carry and to provide the necessary space for electronics, radar and optoelectronics and to provide the required energy supply.

Flight Modes & Maneuvers:

Based on the momentum of the digital technology, a fully autonomous UAV is conceivable. Considering the development time and cost, the preferred method is to remotely fly the UAV towards the target. Remote pilot decides the way to approach the allocated target and makes split adjustments or even change target for the best use of material. An efficient full autonomation could be implemented when the level of Artificial Intelligence "trained" in the complex firefighting matters would become available.

Related to the flight of the preferred embodiment of the UAV:

Ejection is automated—complex and rapid sequence maneuver.

Remote pilot the UAV to the target and release of material triggered by the remote pilot.

Recovery is automated, and it is triggered by the release of material. As a safety backup, the release of material is automatically triggered if the pilot is late, endangering the recovery.

Return to base and landing are automated.

Note that the remote piloted phase represents a small percentage of the total UAV's flight time which is consistent with mission's requirement h). The piloted time is of the order of 1-5 minutes, while the return to base could mean 100 miles or so flight.

The remote pilots are located at a regional command center or, if the low orbit communications are not satisfactory, they will be located in the transporter airplane, or in a dedicated aircraft allocated to the operations. Of note, for the case several transporters operate over a theatre, the method implies the operations are led by an Operation Field Coordinator provided with all the means to get a full situational awareness and means to communicate with all the ground and airborne crews in the area.

The flight, targeting, navigating and piloting electronics are generically indicated in area 700, FIG. 7.

The antenna for communication with the remote pilot is generically indicated 711, FIG. 1. The information received by the pilot include:

Visual (Enhanced Vision System II)—multiple sensors, (712 and 713, FIG. 1).

IR image tuned for high long-lasting temperatures. (712)

Synthetic image—GNSS first iteration (antenna 714, FIG. 1)+precision of position and attitude enhanced by the information from the phased array radar 715, FIG. 7, further described in the following.

Note: the remote pilot can switch in between or overlap the information on his screen or on Wearable Head-Mounted Display.

Figure 16:
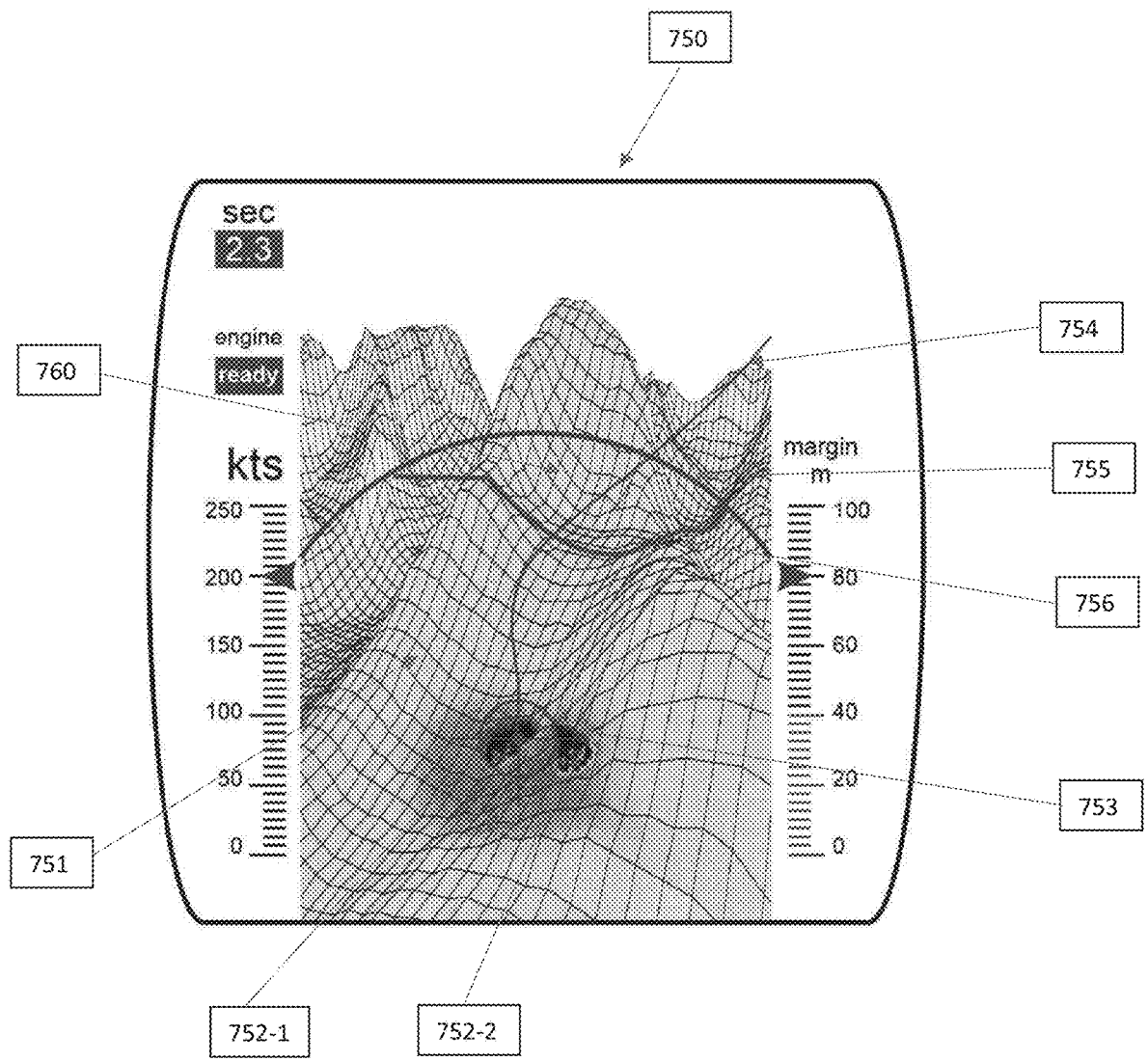
FIG. 16 is a schematic sample showing how the factors and the recovery window could be shown on a remote pilot's display.

Wide angle attitude display, see 750 in FIG. 16, indicating the factors 756, a recommended route to recovery 754, and the recovery "window of opportunity" which is the graphic representation 760 (FIG. 16) of the margins against the factor obstacles as further described in the following.

The Remote Pilot Controls:

All the aerodynamic flight controls (described in the preceding), the engine and the load release.

Through the autopilot: the dive stability 330 (FIG. 7) (approximately what would be an auto-trim on a normal airplane) and the Smooth G system 350 (FIG. 7).

Autopilot Controls 701 (FIG. 7):

All the aerodynamic flight controls (described in the preceding), the engine.

The specific systems disclosed herein: the dive stability 330 and the Smooth G 350 systems.

Wing deployment (during ejection),

The release of the load if the recovery risks to be compromised.

The actuator 886 (FIG. 7) of the landing skid 885.

Autopilot's General Sources:

The flight management unit, referred herein after "navigation system" that stores and provides the navigation and mission data.

Attitude and heading information corrected/updated by the navigation system.

Air speed, angle of incidence & stall warning sensors not shown.

Baro-altimeter for the return route.

Proximity sensor for landing (flaring)

Autopilot's Specific Sources:

The recovery trajectory updated in real time and prompted of the imminent closure of the recovery window of opportunity. (Physically displayed to pilot, FIG. 16)

The position of the stability carrier 333.

The G, and the direction, speed and acceleration of rotation and the torque on the G-winch 351.

The length of the rope 600 remaining on the winch 351.

The Navigation System 702 (FIG. 7):

Stores all route and landing data to feed and supervise the autopilot.

Navigation System's Resources:

GNSS Antenna 714 (FIG. 1).

Phase array radar 715 and processor 716 (FIG. 7).

Dedicated processor unit that corrects in real time position and attitude and update the synthetic image.

Note that an inertial navigation system, INS, is an alternative to the phase array radar for determining the position and attitude and synchronizing the synthetic image; it is a matter of technology advances/cost and of the UAVs operating in a mountainous region.

Additionally, the UAV is equipped with:

Transponder

Emergency Locator Transmitter

Position anti-collision, tail (self-illumination) lights and landing lights (to be visible to the ground crews)

Method & Infrastructure 800

The time to first response is of outmost importance in fighting forest fires; the airborne incandescent materials are not stopped by firebreaks and they generate secondary ignitions resulting in multiple fire fronts. Even under light wind the forest fires expand exponentially with time due to the secondary ignitions.

The method and the related UAVs disclosed herein are capable to putt off fires. And it is understood that there is a window of opportunity, beyond which the resources will become insufficient.

The infrastructure required to minimize the time to first response and to ensure efficient continuous operations, include:

A 24-7 surveillance network that could include from fixed observation points, small robot drones operating from remote inductive recharging platforms, or predator-like UAVs to observation satellites.

One, or a plurality, of on duty 24-7 regional coordination and control centers, "center(s)" hereinafter. Firefighting experts, remote pilots, and an air-traffic specialist/liaison available 24-7 at the centers.

The centers equipped with means to communicate with any allocated surveillance asset, airfield, ground and flying crew and UAV.

Centers equipped with consoles for remote piloting several UAVs at a time and with at least one aircraft equipped with such consoles to be used in difficult conditions, when latency of the low orbit communications becomes a factor. The Operation Field Coordinator "Coordinator" would be located at the center, in the vicinity of the operation theatre or airborne, according to the usable communications methods.

A network of airfields distributed to cover the fire-prone areas. Locations selected such that each fire-prone area could be served from several airfields.

Each airfield provided with reserves of water and fire retardants, fuel and means to handle and service the landed UAVs and the transporters for immediate dispatch.

One, or a plurality of transporter aircrafts based on each airfield. At least one transporter available at moment notice (pilots and ground crew available, fueled, the UAVs loaded into the transporter).

To ensure continuous operations, for each transporter based on an airfield, there should be at least three loads of UAVs (load meaning the maximum number of UAV that fits in a transporter) based on that airfield. During continuous operations, while one load is on route to the fire theatre, one is being recovered, and one is serviced and prepared for a rapid loading into the next available transporter aircraft.

The Method

The example presented in the following assumes an on-going operation.

Preparation

Referring to FIG. 12-*a*, the landed UAVs 100 are hoisted from the field (hoists 804, FIG. 12-*b*) and loaded on the service & loading platform, "platform(s)" 820 that are provided with hoist and rail 827. The UAV 100 is secured on the rail 827, squeezed in between the upper and the lower rolls of the trolleys 801 and 803 as shown in the detail view (FIG. 12-*b*).

Once secured on the platform 820, the UAV is checked if in dispatchable condition and it is serviced for the next mission.

Actions specific to the UAVs associated with the disclosed method include:

Referring to FIG. 10-*b*, the empty container 500-*e* is extracted from the cargo bay 120. The flap door 551 is open and the electrical motor 556 is activated by service switch (not shown) to rotate the spools 552 and 553 in the direction of extracting the empty container 500-*e* from the cargo bay 120.

Referring to FIGS. 7, 9, the rope 600 is passed over the stability spool 331 while the spool's two sides 331-L, 331-R are locked together by pushing carrier 333 forward; subsequently the carrier 333 (FIG. 9) is pulled to the foremost position by activating by service switch (not shown) the actuator 337 (FIG. 7).

Before filling (filler caps not shown) the firefighting material 501, the container 500 is resealed. The seams 521 (FIG. 11-*a*) are zipped and the lower ends are squeezed in between the two pressure plates 526 and 527 (FIG. 11-*a*) of the mechanism 525 and said mechanism is then re-armed for the next trigger open.

The fuselage 110 (FIG. 3) is unlocked and folded by service switch (not shown) activating the electrical motors 114 (FIGS. 3, 7) and the wings 101 are unlocked and folded using the actuators 104 (FIG. 4).

Referring to FIGS. 12-*a*, 12-*b*, the UAVs are loaded from the platforms 820 to the transporter 900 by using a transfer rail 837 that bridges platform's rail 827 with the rail 907 provided in the transporter airplane 900. Moving an UAV along the rails is done manually or by activating the motor 802 (not shown) provided on the trolley 801. Holding the UAVs in a fix position along the rails 827, 907 is accomplished by a brake (not shown) provided on at least one of the trolley 801, 803. The container 500 is transported to the ramp door 902 of the transporter 900 by a cart not shown.

An alternate way of loading the UAVs 100 into the transporter 900 is to pre-load them on a rack 840 as shown in FIG. 12-*a*. The rack 840 accommodate as many UAVs as the transporter 900 could carry. In this case the transporter's rail 907 is marked 837 and provided on the rack 840.

A rack expedites the loading of the transporter. It also reduces the number of adaptations on the transporter 900 since there are already in use racks for carrying firefighting containers, as the Modular Airborne FireFighting System (MAFFS) system, used on the C130. Positioning, loading and securing the rack 840 into the transporter 900 should be common with the MAFFS-type racks in use.

As an option, before the takeoff, the wings 101 of the UAV are pushed in "anti-balance position". The actuators 104 (FIG. 4) are activated to push the wings 101 against some protection plates (schematically shown 909 in FIG. 4) provided on the walls of the cargo bay to prevent balancing during flight.

Protection plates 849 are provided on the racks 840.

In a continuous operation the UAVs are loaded into the transporter 900 during transporter's preparations for the next flight.

Departure for a fire theatre is done per order of the regional center and per the flight plan issued by the center.

If arrived over the theatre, without receiving further instructions, loiter flight to gather and transmit information to improve Center's/Coordinator's situational awareness.

At any time, prior to takeoff, during the flight or during the loitering flight when the UAVs' return route core information is received from the center, it is automatically (wireless preferred) loaded into UAVs' navigation system 702. The core information includes:

The heading after recovery to intersect the return route and the route.

Delay instructions: zigzag and holding patterns and coordinates as these may be necessary to land at a predetermined time.

Landing instructions.

Pre-Ejection Phase.

Ejecting several UAVs in rapid sequence is key for achieving the high delivery density speed to put off a fire or for fighting secondary ignitions.

The brake and the motor 802 provided on the trolley 801 (FIG. 12-b) are integrated into the automation of the ejection.

Per pre-eject command, the rear door 901 of the transporter 900 is opened if not already, the wings 101 of the rearmost UAV in the rearmost 100-R position (FIG. 6) are folded back from their anti-balance position and trolley 801 (FIG. 12-b) rolls the UAV backward until it reaches the eject position, which is bumped into the stopper mechanism 908 (not shown) provided on the rail 907. In the eject position, the wings 101 are raised as high as permitted by the door 901 (FIG. 13).

A remote pilot is allocated to the UAV ready for ejection and he receives his target, and instructions from the coordinator. Pilot also automatically receives an ejection time slot issued in correlation with all the other transporters 900×n (not shown) and UAVs×n (not shown) operating in the theatre.

Just before the ejection, the navigation system 702 of the UAV 100-R is loaded with the remaining route information: the time of landing, cruising altitude(s), the current altitude and GPS coordinates and at least some approximate coordinates and altitude of a target selected by the coordinator. Time of landing and cruise altitude are set to provide separation from the previous UAV launched in the same theatre and using the same return route.

Upon the eject command, the motor 802 of the trolley 801, FIG. 7, is activated, the stopper mechanism 908 is released and the UAV is pushed off the rail 907 (FIG. 12-a), moment at which the actuators 104 (FIG. 4) start the complete deployment of the wings.

Initially the Smooth-G system 350, FIG. 7, let's the rotor of the G winch 351 free to extend the rope 600 for a predetermined length, then it starts to apply torque until the rope stops unwinding. At that moment, the load on the rope is equal with the propulsion force the UAV needs to maintain same speed as the transporter 900.

The UAV 100 climbs above transporter wake (FIG. 14-a) and the aerodynamic brakes 302 (FIG. 1) and 303 (FIG. 2), are deployed until the container 500 is pulled off the platform 902 of the transporter 900.

When the fall of the container 500 from the platform 902 is "felt" by the Smooth-G system 350 it sends a signal and the autopilot 701 that folds the brakes 302 and 303, and engages the UAV in a steep dive to follow the falling container, FIG. 14-b, and it sets a low torque for the G-Winch to protect the UAV from shocks.

The low initial torque/pull on the rope results in an unwinding of the rope 600 from the G-winch 351, and then, the torque is gradually increased until the direction changes into winding the rope 600, pulling the UAV towards the falling container 500, FIG. 14-c.

Once the distance in between the UAV 100 and the container 500 reaches a prescribed value, the G-winch 351 stops rotating and the navigation unit 702 sets the autopilot 701 to turn the UAV to the heading and adjust the dive slope to reach the target and prompts the remote pilot with the "your controls" message, FIG. 14-d.

Note that after the container 500 falls off the platform 902 the motors 802 of the trolley 801 of all UAVs remaining in the transporter 900 are activated to bring the remaining UAV in and optimum position per the weight and balance specifications of the transporter.

The Dive Phase

The remote pilot is able to change the target or to change the route to approach the target. During this phase, the dive stability system 330 (FIGS. 7, 8-a, 8-b) works like an auto trim in a normal airplane.

Unless a slow descent or horizontal flight is desired, engine 201, FIG. 1, is not started. If the engine is not started earlier (powerless glide or dive), it starts automatically, triggered by the release of the material and engaging in the recovery maneuver.

Reemphasizing, one main goal of the present invention is the capability to operate under no visibility conditions.

The 3D terrain maps of the possible operation theatres are pre-loaded into the navigation system 702 (FIG. 7).

If low or no visibility, night for instance, the pilot brings on his displays the synthetic image of the terrain and if fire itself is obscured by the cumulus or the smoke he has the option to overlap the IR over the synthetic terrain.

On the flat ground the coordinates used to generate the synthetic view are provided by the GNSS. Altitude information is backed by a radio altimeter or by the phased array radar.

In the mountains, the precision of the synthetic image is of paramount importance for recovery and it is in the mountains where reflections may trick the GPS and where a radio altimeter is worthless.

The phased array radar 715 and its processor 716, FIG. 7, provided on the preferred embodiment of the UAV 100 is used to increase the precision of the synthetic image. The GNSS coordinates are used as the first approximation to extract and operate on a limited area of the terrain map stored in the navigation system. Mountains still offers the advantage of recognizable points, good references for both position and for altitude. From the radar 715, 716, a limited number of relevant references are extracted and then the appropriate software is overlapping those for the best match on the 3D map, and it corrects the position and attitude and the displayed synthetic image.

Reiterating, an INS is an alternative to the phased array radar, depending on the topography of the intended operating zone of the UAVs and on the advances in technology.

Material Release Phase

According to the objective of the present invention, the disclosed method and of the associated UAV covers the entire material release types, from high dispersion/low delivery density to high delivery density speeds including dropping multiple loads on the same target.

The efficient way to put off low energy grass fires is by releasing the material in a tangential flight, higher over the target. For higher energy fires, the delivery density is increased by lowering the height from which the material is released. The advantage of the disclosed method and UAV is that, after releasing the material, the UAV becomes very maneuverable which allows its recovery after reaching areas and low heights, not normally reachable by current aerial firefighting, e.g., FIG. 15.

However, it is the dive-bombing capability that can achieves the high delivery density speed required to put off the high intensity forest fires and this is presented in some detail:

Specific piloting aids are available to the pilot in real time. FIG. 16 offers an example of display on the remote pilot's, console. The specific arrangement and the detailed information are not the subject of the present invention. The display 750 shows the synthetic view 751 as in the case of no visibility. The infrared image is overlapped on the synthetic view and two closely located ablaze targets are visible 752-1, 752-2. Such close targets appear just as one from transporter's altitude and this explains the importance of remote pilot's split decision. Shown: The pilot selects the lower and higher intensity target 752-1 which appears in the crosshair 753.

The recovery trajectory is calculated and updated in real time by the navigation system 702 taking into account UAV's speed and attitude in respect to the obstacles that are determined to represent a factor, obstacles that are represented by the curve 756. The curve 755 defines the possible separation from the obstacles for maximum G, maximum engine power.

The area between the curves 755 and 756 is referred herein the "recovery window of opportunity" 760. Diving lower, closer to the target, narrows the window of opportunity and the material is released before its closure, before a crash would be imminent. If the pilot is slow to react to window's closure the navigation system automatically triggers the release of material and engages into the recovery maneuver.

FIG. 15 is a simplified 2-D example of a dive bombing to achieve a Maximum delivery density on a difficult to reach target.

The UAV is engaged on trajectory A-B, a steep dive at angle α along the slope 860 of the mountain. All brakes 302, FIG. 1, and 303, FIG. 2, are fully deployed.

At point B the release of the container 500 and the start of the engine 201 are triggered by the remote pilot.

After the release the remote pilot could switch at any time to autonomous mode.

Prompted by the release command, the G-winch 351, FIG. 7, frees rope 600 for a length L calculated to reach the desired height H over the target (accounting for the parabolic gravitational drop 6) plus a safety margin ΔL to avoid any shocks on the UAV 100. Reaching the L extension triggers the release the material 501. The plates 526 and 527, FIG. 11-a, of the mechanism 525 are pushed apart and the seams 521 open and the material 501 is released.

As soon as material is released the G-Winch 351 starts to pull the emptied container 500-e to be stored in the cargo bay 120 of the UAV 100 as previously described.

Freeing the rope 600 at point B reduces the downhill force which results in the deceleration of the UAV 100 that, at point C, reaches a speed that allows a recovery radius R with the lowest point D of the trajectory at the selected safety height S over the terrain. At point C the brakes 302, FIG. 1, and 303, FIG. 2, are folded.

Of note, the UAV 100 enters the recovery without carrying the weight of the material 501 and of container 500 and this translate into a lighter structure capable of withstanding high-G maneuvers.

At point D the autopilot 701 sets the engine 201 at max power and the UAV engages on the angle β until the speed drops to Vx at point F after which the engine is set to max continuous and the climb is corrected to the max climb angle and continues until reaching the allocated return altitude.

The Return Flight

When the preprogrammed cruise return altitude is reached the autopilot turns the UAV to the pre-programmed heading for intersecting the return route and it sets the engine 201 at cruise power.

Upon intersection, the autopilot takes the return route and the navigation system adjusts cruising speed to reach the airfield at the preprogrammed time. If the speed would be too low for stable flight the autopilot would enter either the preprogrammed zig-zag pattern or the holding pattern, both the zig-zag and the holding in predetermined areas, depending on the necessary delay.

To note that arriving at the preprogrammed time ensures smooth operations and the target landing time includes a safety margin that ensures the on-time arrival even if this implies additional maneuvers like zig-zag or holding pattern.

Landing

The autopilot 701, FIG. 7, stops the engine 201, FIG. 7, and by signal from proximity sensor it flares at 6-3 ft. until stall warning signal prompts the deployment of all segments of the aerodynamic brakes 302, FIG. 2, and the UAV touches down with the wear resistant tips 887 of the rudders 313-, FIG. 1, and it bumps on the front skid 885 extended by the actuator/damper 886, FIG. 7, during the final approach.

The landed UAVs are hoisted out of the field and serviced/prepared for the next mission as described above.

Although the present invention has been described with reference to exemplary embodiments and implementations, the present invention is not limited to or by such exemplary descriptions. For example, the method and the UAV's disclosed by the current invention are described in connection with firefighting, but obviously the same method could be used as a safe and cost-effective method to deliver military-use materials to a specified location on a military-operations theatre.

The invention claimed is:

1. A method for delivering materials to a selected location to extinguish fires, comprising:

a. providing an unmanned aerial vehicle (UAV) that includes a navigation system, an autopilot system, aerodynamic flight control surface means, opto-electronics, data link and a propulsion system, wherein the UAV is adapted to be remotely piloted by a remote pilot and to fly autonomously, and wherein the UAV comprises at least one foldable structure selected from the group consisting of one or more foldable wings, one or more foldable stabilizing structures and controls surfaces, a foldable fuselage and a combination thereof, b. providing (i) a flexible container that defines a plurality of liquid-tight seams, the flexible container containing fire-fighting materials selected from the group consisting of water, fire suppressing materials, fire retardant materials and combinations thereof, (ii) a cable or rope attaching the flexible container to the UAV, (iii) a seam releasing mechanism, (iv) a winch provided on the UAV, the winch capable of controlled windup and unwind of the cable or rope and wherein control of the windup and unwind of the cable or rope controls load in the cable or rope, speed of movement of the cable or rope, length of the cable or rope between the flexible container and the UAV, and wherein the UAV, the flexible container and the cable or rope define a UAV assembly, c. positioning the UAV assembly in a transporter aircraft that defines a load carrying structure that permits loading and repositioning of the UAV assembly within the transporter aircraft, and detachably securing the UAV assembly with respect to a cargo system of the transporter aircraft, d. transporting the UAV assembly in the transporter aircraft to a position in proximity to the selected location with the at least one foldable structure of the UAV is in a folded position, e. assigning a remote pilot for the UAV assembly, said assigned remote pilot interacting with one or more consoles located on the transporter aircraft or in a remote location;

f. prior to ejection of the UAV assembly from the transporter aircraft, uploading route and landing instructions for at least one predetermined airfield to the navigation system of the UAV assembly, g. prior to ejection of the UAV assembly from the transporter aircraft, uploading a selected airfield from among the at least one predetermined airfield to the navigation system of the UAV assembly, updating the cruising altitude and specifying the time of landing that provides a safety separation relative to other UAV assemblies previously ejected over an operation theatre that includes the selected location insofar as the other UAV assemblies have been directed to the selected airfield, h. ejecting the UAV assembly from the transporter aircraft at a position above or in proximity to the selected location in response to a command from the remote pilot, wherein ejecting the UAV assembly comprises
partially unfolding the at least one foldable structure from the folded position before the UAV breaks physical contact with the transporter aircraft,
fully unfolding the at least one foldable structure of the UAV assembly after the UAV breaks physical contact with the transporter aircraft, and
using the winch to extend the length of the cable or rope between the UAV and the flexible container to protect the UAV from shock and then using the winch to reduce the length of the cable or rope extending between the UAV and the flexible container to a prescribed value;

i. directing the UAV assembly towards the selected location with adjustment by the remote pilot, j. remotely triggering release of the fire-fighting materials from the UAV assembly by remotely triggering the seam releasing mechanism to open at least one of the plurality of liquid-tight seams of the flexible container, k. after releasing the fire-fighting materials from the flexible container, engaging the UAV assembly into a climb maneuver and pulling the flexible container that has released the fire-fighting materials into a compartment within the UAV by initiating the winch to wind up the cable or rope, l. upon reaching an uploaded cruise altitude, guiding the UAV assembly to intersect with a pre-programmed route towards the selected airfield and taking said intersected route, flying and landing on the selected airfield based on the navigation system connected to the autopilot provided on the UAV assembly.

2. The method of claim 1, further comprising providing a plurality of UAVs and wherein the plurality of UAVs are positioned in the transport aircraft for transport to one or more positions above or in proximity to the operation theatre.

3. The method of claim 1, wherein the operation theatre includes a geographic location where at least one structure or vegetation is ablaze.

4. The method of claim 1, wherein the fire-fighting materials are loaded into the flexible container of the UAV before positioning the UAV in the transporter aircraft.

5. The method of claim 1, wherein the fire-fighting materials are loaded into the flexible container of the UAV after positioning the UAV in the transporter aircraft.

6. The method of claim 1, wherein altitude and attitude information for the UAV assembly is supplied by a Global Navigation Satellite System and by an attitude indicator associated with the navigation system of the UAV.

7. The method of claim 1, wherein release of the fire-fighting materials is remotely triggered by a target or ground proximity system provided on the UAV.

8. The method of claim 1, further comprising providing a dive stability system that adjusts the length of the cable or rope based on forces exerted by the flexible container in respect to a pressure center defined by the UAV.

9. The method of claim 8, wherein the dive stability system includes a stability pulley slidably installed on a guide provided on a belly of the UAV.

* * * * *